United States Patent
Chi et al.

(10) Patent No.: US 12,272,504 B2
(45) Date of Patent: Apr. 8, 2025

(54) KEYSWITCH ASSEMBLY

(71) Applicant: Darfon Electronics Corp., Taoyuan (TW)

(72) Inventors: Chih-Yao Chi, Taoyuan (TW); Ling-Hsi Chao, Taoyuan (TW); Da-Shan Hsu, Taoyuan (TW); Shao-Lun Hsiao, Taoyuan (TW); Yu-Chun Hsieh, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 268 days.

(21) Appl. No.: 17/821,814

(22) Filed: Aug. 24, 2022

(65) Prior Publication Data

US 2023/0187147 A1 Jun. 15, 2023

(30) Foreign Application Priority Data

Dec. 15, 2021 (TW) .................. 110147046
Jan. 18, 2022 (TW) .................. 111102080

(51) Int. Cl.
*H01H 13/14* (2006.01)
*H01H 13/20* (2006.01)
(Continued)

(52) U.S. Cl.
CPC ............ *H01H 13/14* (2013.01); *H01H 13/20* (2013.01); *G06F 3/0202* (2013.01); *G06F 3/03543* (2013.01); *H01H 2215/00* (2013.01)

(58) Field of Classification Search
CPC .... H01H 13/14; H01H 13/20; H01H 2215/00; H01H 13/85; H01H 2221/04;
(Continued)

(56) References Cited

U.S. PATENT DOCUMENTS 8,537,114 B2 9/2013 Ma
8,803,804 B2 8/2014 Kao
(Continued)

FOREIGN PATENT DOCUMENTS

CN 201307270 A 9/2009
CN 201307270 Y 9/2009
(Continued)

OTHER PUBLICATIONS

TW Office Action dated Aug. 23, 2022 in Taiwan application No. 111102080.
(Continued)

*Primary Examiner* — Shawki S Ismail
*Assistant Examiner* — Lisa N Homza
(74) *Attorney, Agent, or Firm* — McClure, Qualey & Rodack, LLP

(57) ABSTRACT

A keyswitch assembly includes a base, a pressable plate, a first magnetic acting member and a second magnetic acting member. An accommodating space is defined within the base, and an upper surface of the base is provided with a connecting portion. The pressable plate includes a pressing portion, an acting portion and a pivotal connection portion located between the pressing portion and the acting portion and pivotally connected to the connecting portion. The first magnetic acting member is disposed on the acting portion; the second magnetic acting member is disposed on the base corresponding to the first magnetic acting member. The keyswitch assembly is configured such that the first magnetic acting member and the second magnetic acting are attracted or repulsed each other by a magnetic force, so as to provide or change a pressing resistance of the pressing portion.

18 Claims, 17 Drawing Sheets

(51) Int. Cl.
*G06F 3/02* (2006.01)
*G06F 3/0354* (2013.01)

(58) Field of Classification Search
CPC . H01H 13/705; G06F 3/0202; G06F 3/03543; G06F 3/016
USPC .......................................................... 335/205
See application file for complete search history.

(56) References Cited

U.S. PATENT DOCUMENTS

| | | | |
|---|---|---|---|
| 8,937,520 B2 | 1/2015 | Kan | |
| 10,147,570 B2 | 12/2018 | Unnikrishnan et al. | |
| 10,452,160 B2 | 10/2019 | Tseng et al. | |
| 11,625,159 B2* | 4/2023 | Merminod | G06F 3/0213 200/336 |
| 2010/0245248 A1* | 9/2010 | Hsiao | A61P 37/06 345/163 |
| 2011/0256831 A1* | 10/2011 | Hsieh | G06F 3/038 455/41.2 |
| 2013/0249658 A1* | 9/2013 | Kan | H01H 36/00 335/206 |
| 2018/0190446 A1* | 7/2018 | Chen | H01C 10/10 |
| 2018/0210564 A1* | 7/2018 | Chen | G06F 3/03543 |
| 2018/0356900 A1* | 12/2018 | Hsiao | G06F 3/038 |
| 2018/0373354 A1* | 12/2018 | Hsiao | H01H 13/10 |
| 2019/0146600 A1* | 5/2019 | Tsai | G06F 3/0202 345/163 |
| 2020/0333893 A1* | 10/2020 | Lin | G06F 3/03543 |
| 2020/0341626 A1* | 10/2020 | Merminod | G06F 3/0213 |
| 2021/0113918 A1 | 4/2021 | Soelberg | |
| 2022/0413627 A1* | 12/2022 | Battlogg | G06F 3/03543 |
| 2023/0027021 A1* | 1/2023 | Li | G06F 3/03543 |
| 2024/0036662 A1* | 2/2024 | Goh | G06F 3/03543 |
| 2024/0036665 A1* | 2/2024 | Goh | H03K 17/97 |

FOREIGN PATENT DOCUMENTS

| | | |
|---|---|---|
| CN | 101667072 A | 3/2010 |
| CN | 102043477 A | 5/2011 |
| CN | 102043479 A | 5/2011 |
| CN | 102446002 A | 5/2012 |
| CN | 107632723 A | 1/2018 |
| CN | 107646099 A | 1/2018 |
| CN | 111857386 A | 10/2020 |
| CN | 113342191 A | 9/2021 |
| TW | M432878 U | 7/2012 |
| TW | I420349 B | 12/2013 |
| TW | I597628 B | 9/2017 |
| TW | M570463 U | 11/2018 |

OTHER PUBLICATIONS

CN Office Action dated Jun. 1, 2023 in Chinese application No. 202210067597.6.

* cited by examiner

KEYSWITCH ASSEMBLY

CROSS-REFERENCE TO RELATED APPLICATION

This application claims the priority benefits of Taiwan patent application serial no. 110147046 filed on Dec. 15, 2021 and Taiwan patent application serial no. 111102080 filed on Jan. 18, 2022. The entirety of the mentioned above patent applications are hereby incorporated by reference herein and made a part of this specification.

BACKGROUND OF THE INVENTION

1. Field of the Invention

The present invention relates to a keyswitch. Particularly, the present invention relates to a keyswitch assembly that provides the tactile feedback through magnetic acting members.

2. Description of the Prior Art

The keyswitch assembly usually includes a switch and a pressing member (such as a plate or a keycap) disposed above the switch. Typical switches include mechanical microswitches, membrane switches and optical switches. The trigger point of the mechanical microswitch has a clear pressing resistance, enabling the user to experience the tactile feedback. The tactile feedback of the membrane switch is smaller.

The mechanical microswitch and the membrane switch are continuously worn-down during use, resulting in shorter lifetime. During the triggering process of the optical switch, the optical switch itself does not include any movable parts or deformable members, effectively mitigating the worn-down issue. However, the optical switch itself cannot provide any tactile feedback.

SUMMARY OF THE INVENTION

The present invention provides a keyswitch assembly to address the above technical problems.

In one embodiment, the present invention provides a keyswitch assembly including a base, a pressable plate, a first magnetic acting member and a second magnetic acting member. The base has an upper surface. The pressable plate has a pressing portion, an acting portion and a pivotal connection portion. The pressable plate is pivotally connected to the base. The first magnetic acting member is disposed on the acting portion. The second magnetic acting member is disposed on the base corresponding to the first magnetic acting member. The first magnetic acting member and the second magnetic acting member are configured to be attracted or repulsed to each other by a magnetic force, so as to provide or change a pressing resistance of the pressing portion.

In at least one embodiment, the first magnetic acting member and the second magnetic acting member are a combination of a magnetically conductive element and a magnet.

In at least one embodiment, the first magnetic acting member and the second magnetic acting member are magnets, and the first magnetic acting member and the second magnetic acting member face each other with the same or different magnetic poles.

In at least one embodiment, the upper surface is provided with a groove adapted to accommodate the second magnetic acting member in the groove. The acting portion is provided with a protruding post extending into the groove. The first magnetic acting member is disposed on the free end of the protruding post.

In at least one embodiment, the protruding post has a first surface. The groove has a second surface. The first surface includes a post angle with a surface of the pressable plate. The second surface includes a groove angle with a surface of the base, and the groove angle corresponds to the post angle.

In at least one embodiment, the pivotal connection portion is located between the pressing portion and the acting portion. The first magnetic acting member on the acting portion and the second magnetic acting member on the base are attracted to each other by the magnetic force.

In at least one embodiment, the acting portion is located between the pressing portion and the pivotal connection portion, or the pressing portion is located between the acting portion and the pivotal connection portion. The first magnetic acting member on the acting portion and the second magnetic acting member on the base are repulsed to each other by the magnetic force.

In at least one embodiment, the first magnetic acting member is located on a side of the pressable plate facing the base, and the second magnetic acting member is embedded on the upper surface of the base.

In at least one embodiment, the base has an accommodating space. The first magnetic acting member is located on a side of the pressable plate facing the base, and the second magnetic acting member is embedded on an inner wall surface around the accommodating space.

In at least one embodiment, the base has an accommodating space. The upper surface is provided with a perforation communicating with the accommodating space. The pressing portion is provided with a blocking piece extending into the accommodating space from the perforation.

In at least one embodiment, the keyswitch assembly further includes a circuit board and an optical switch. The circuit board is fixed on the base and located in the accommodating space. The optical switch is disposed on the circuit board. When the pressing portion is pressed to enable the first magnetic acting member to move relative to the second magnetic acting member, the blocking piece blocks an optical path of the optical switch to trigger the optical switch to generate a trigger signal.

In at least one embodiment, the keyswitch assembly further includes a fixing member and a cantilever. The fixing member is fixed on an upper casing of the base; the base has an accommodating space. The fixing member is at least partially located in the accommodating space. The cantilever is located in the accommodating space; one end of the cantilever is fixed on the fixing member, and another end of the cantilever is adapted to position the second magnetic acting member. The upper surface of the base is provided with an opening corresponding to the first magnetic acting member, and the second magnetic acting member is partially received in the opening.

In at least one embodiment, the keyswitch assembly further includes an adjusting element. The adjusting element can be rotatably or movably disposed on the base, and the second magnetic acting member is disposed on the adjusting element. The relative position of the first magnetic acting member to the second magnetic acting member is changed by rotation or movement of the adjusting element.

In at least one embodiment, the base has an accommodating space. The adjusting element includes a movable member movably disposed on the base, and the movable member is at least partially located in the accommodating space. The upper surface of the base is provided with an opening. The acting portion is provided with a protruding post extending into the opening, and the second magnetic acting member is disposed on the movable member. The movable member is adapted to move relative to the base to change the relative position of the first magnetic acting member and the second magnetic acting member.

In at least one embodiment, the upper surface is formed with a positioning hole, and the movable member passes through the positioning hole.

In at least one embodiment, the positioning hole is provided with a positioning slot. The movable member has a plurality of positioning bumps selectively engaged with the positioning slot.

In at least one embodiment, the adjusting element includes a shaft and a turntable. The shaft is rotatably disposed on the base. The turntable is disposed on the shaft. The second magnetic acting member is disposed on an outer peripheral surface of the turntable.

In at least one embodiment, the adjusting element is a shaft. The second magnetic acting member is disposed on the shaft. The second magnetic acting member is an eccentrically arranged rotating element. The second magnetic acting member is adapted to rotate with the shaft to change a minimum interval between the second magnetic acting member and the first magnetic acting member.

In at least one embodiment, the adjusting element includes a shaft, a guiding plate and a guiding base. The shaft is rotatably disposed on the base. The guiding plate is disposed on the shaft and provided with a spiral groove. The guiding base is provided with a guiding rod slidably inserted into the spiral groove. The second magnetic acting member is disposed on the guiding base. The guiding rod slides in the spiral groove to change an interval between the second magnetic acting member and the first magnetic acting member as the shaft rotates.

In at least one embodiment, the keyswitch assembly includes a plurality of the second magnetic acting members. The plurality of the second magnetic acting members is identical and divided into a plurality of groups having different numbers of the second magnetic acting members. The plurality of groups is respectively disposed at different positions of the adjusting element.

In at least one embodiment, the keyswitch assembly includes a plurality of the second magnetic acting members. The plurality of the second magnetic acting members is different in magnetic intensity and respectively disposed at different positions of the adjusting element.

In at least one embodiment, the upper surface is provided with a recess, and the recess communicates with the accommodating space through an opening. A shaft seat is disposed between the recess and the accommodating space. The shaft has a front portion, a handle portion and a flange portion. The shaft is inserted through the opening, so the front portion is located in the accommodating space, the handle portion is located at the recess, and the flange portion is located between the front portion and the handle portion and seated in the shaft seat.

According to the embodiments of the present invention, the first magnetic acting member and the second magnetic acting member are attracted or repulsed to each other by a magnetic force, and an instant escape will occur when the external force is greater than the magnetic force between the first magnetic acting member and the second magnetic acting member. It can effectively replace the tactile feedback provided by the traditional mechanical structure, and is suitable for the switch devices lack of tactile feedback, such as optical switches. The process of generating the tactile feedback does not involve the interferences between the elements, which can avoid the worn-down operations between the elements. By adjusting the relative positions of the magnetic acting members, the embodiments of the present invention can also quickly adjust the magnitude of the tactile feedback.

DETAILED DESCRIPTION OF THE PREFERRED EMBODIMENT

In order to have a further understanding of the purposes, structures, features, and functions of the present invention, the following detailed descriptions are given in conjunction with the embodiments. The inventive concepts of each embodiment of the present invention need to consider the following basic restrictions and solve related problems: (1) in order to achieve tactile feedback on the keyswitch, it is intuitively necessary to additionally set up a feedback mechanism to physically connect the pressing member to provide appropriate tactile feedback during use; (2) the aforementioned feedback mechanism not only increases the complexity of the keyswitch, but at the same time, the physically connected feedback mechanism is easily worn-down due to repeated operations; (3) when the optical switch is adopted, the embodiment of the present invention must be able to provide the pressing resistance as the tactile feedback if the keyswitch has no other elastic member to provide the restoring force; and (4) The pressing resistance can be further switched or changed, so that the same keyswitch can provide different tactile feedbacks.

Figure 1:
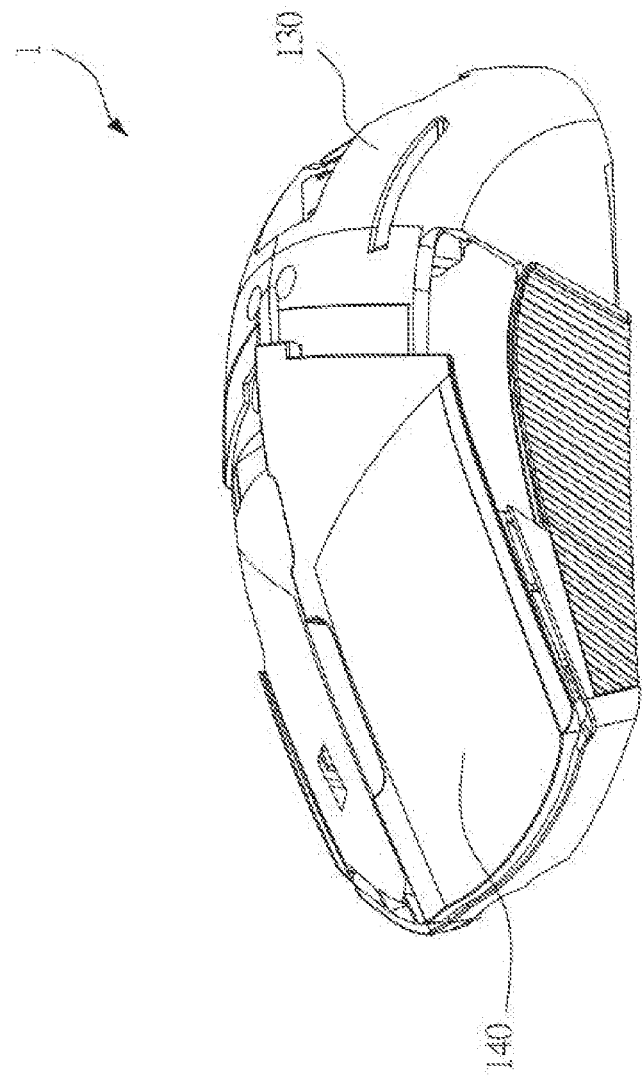
FIG. 1 is a three-dimensional schematic diagram of the appearance of the keyswitch assembly in the first embodiment of the present invention.
Figure 2:
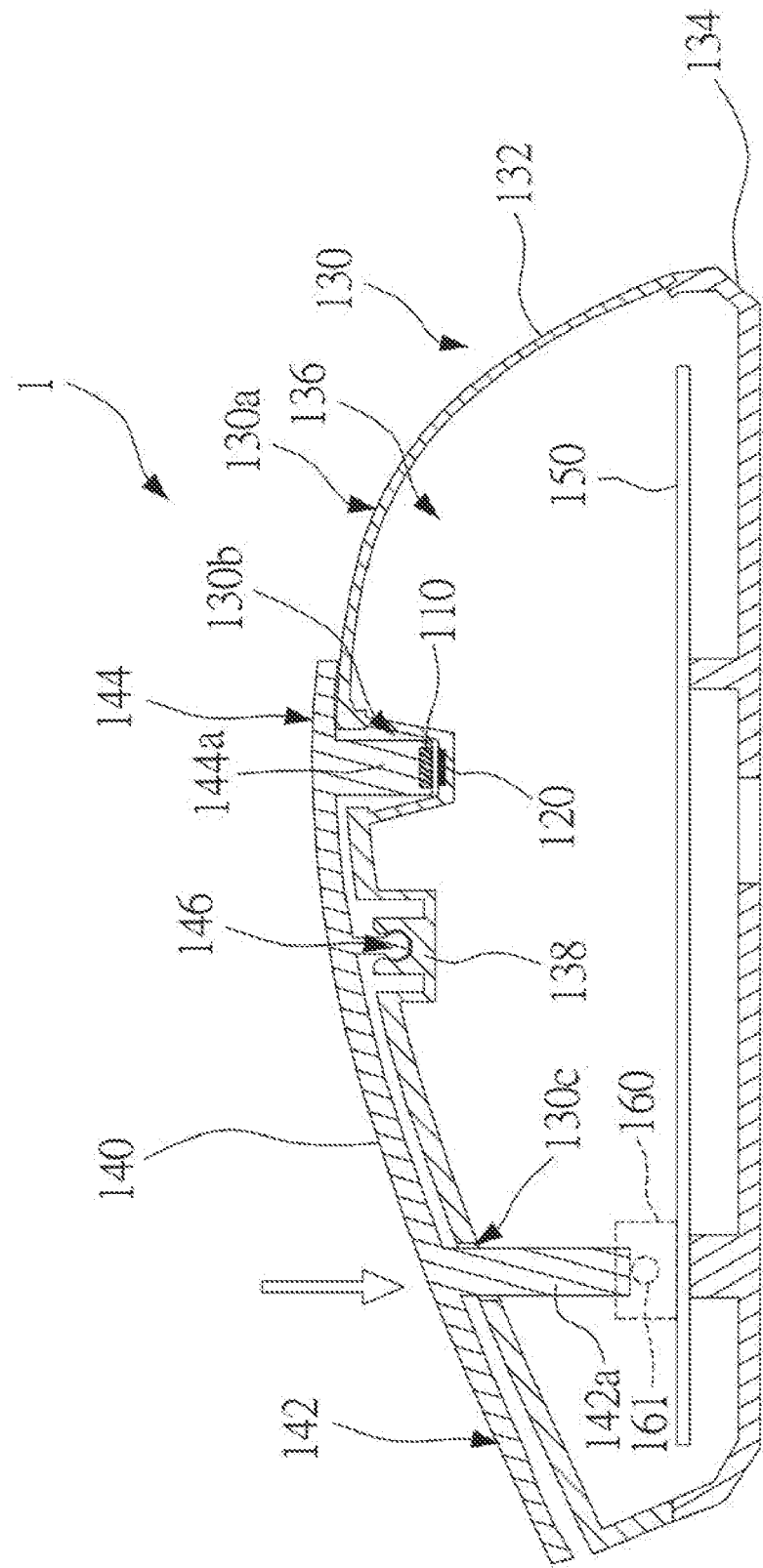
FIG. 2 is a cross-sectional diagram of the keyswitch assembly in the first embodiment of the present invention.

Please refer to FIG. 1 and FIG. 2, which illustrate that the keyswitch assembly of the first embodiment is applied to an electronic device. The electronic device may be, but not limited to, an input device such as a mouse, a trackball, and the like. The keyswitch assembly 1 includes a base 130, a pressable plate 140, a first magnetic acting member 110 and a second magnetic acting member 120.

As shown in FIG. 1 and FIG. 2, the base 130 may be a housing of the electronic device, and the base 130 includes an upper casing 132 and a lower casing 134. The upper casing 132 is combined with the lower casing 134 to define an accommodating space 136 within the base 130. The outer surface of the upper casing 132, i.e., the upper surface 130a of the base 130, is provided with a connecting portion 138.

As shown in FIG. 1 and FIG. 2, the pressable plate 140 has a pressing portion 142, an acting portion 144 and a pivotal connection portion 146. The pressable plate 140 can be a flat plate, or can have a curved contour to match the upper surface 130a of the base 130. The pivotal connection portion 146 is located between the pressing portion 142 and the acting portion 144, and is pivotally connected to the connecting portion 138, so that the pressing portion 142 and the acting portion 144 can move up and down on the upper surface 130a in opposite directions, that is, the pressable plate 140 swings back and forth with respect to the connection portion 138.

Figure 5:
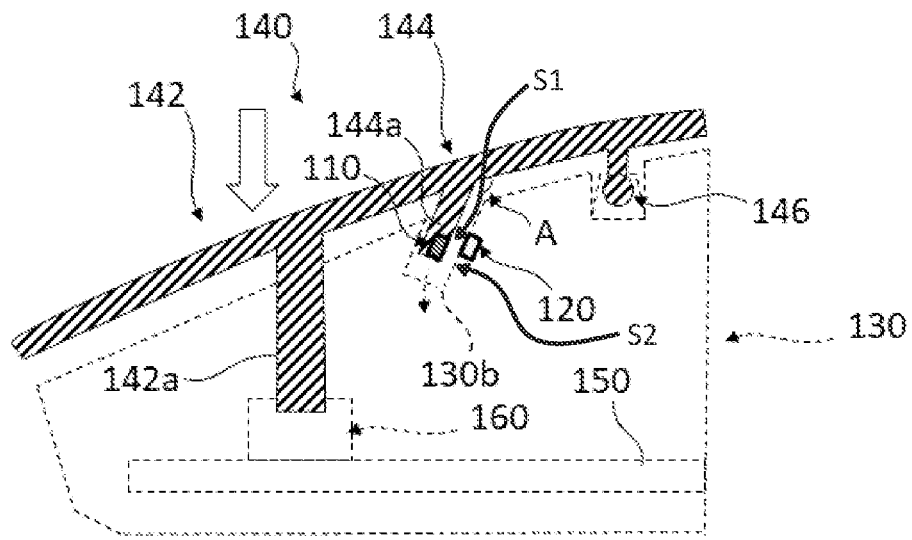
FIG. 5 and FIG. 6 are partially enlarged cross-sectional diagrams of the keyswitch assembly of a variant embodiment of the first embodiment of the present invention.
Figure 6:
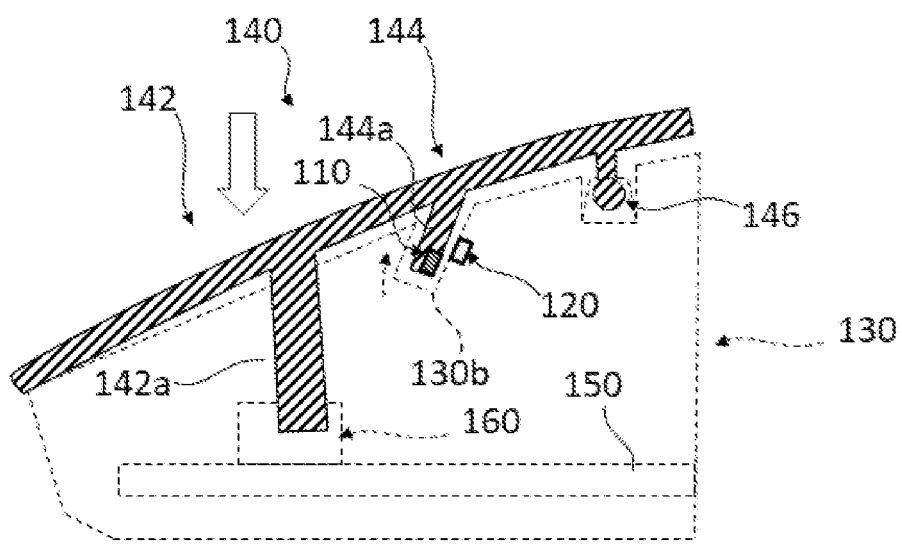

The pivotal connection portion 146 of the following embodiments of the present invention is not necessarily limited to be located between the pressing portion 142 and the acting portion 144. In different embodiments (as shown in FIG. 5 and FIG. 6), in the embodiments that the first magnetic acting member 110 and the second magnetic acting member 120 are magnetically repulsive to each other, the acting portion 144 can be located between the pressing portion 142 and the pivotal connection portion 146, or the pressing portion 142 can be located between the acting portion 144 and the pivotal connection part 146. In practical applications, the first magnetic acting member 110 and the second magnetic acting member 120 can be modified to be magnetically attracted or repulsed to each other (FIG. 1, FIG. 2, FIG. 3 and FIG. 4 illustrate embodiments that the first magnetic acting member and the second magnetic acting member are attracted to each other by the magnetic force, and FIG. 5 and FIG. 6 illustrate embodiments that the first magnetic acting member and the second magnetic acting member are repulsed to each other by the magnetic force), to incorporate the three relative positions of the pivotal connection portion 146, the pressing portion 142 and the acting portion 144, so that the tactile feedback can be changed by changing the pressing resistance of the pressing portion.

As shown in FIG. 1 to FIG. 6, the first magnetic acting member 110 and the second magnetic acting member 120 are attracted or repulsed to each other by the magnetic force. The first magnetic acting member 110 is disposed on the acting portion 144 of the pressable plate 140. The second magnetic acting member 120 is disposed on the base 130, and the second magnetic acting member 120 is disposed corresponding to the first magnetic acting member 110. The first magnetic acting member 110 and the second magnetic acting member 120 are attracted or repulsed to each other by the magnetic force, so as to provide, increase or decrease the pressing resistance. That is, the interaction force between the first magnetic acting member 110 and the second magnetic acting member 120 can be adapted to provide the pressing resistance (if no other restoring mechanism exists), or to assist in increasing the pressing resistance (if other acting mechanism exists), or to assist in decreasing the pressing resistance (if other acting mechanism exists). Accordingly, the acting portion 144 moves close to (or away from) the upper surface 130a due to the magnetic force, and the pressing portion 142 moves away from (or close to) the upper surface 130a due to the magnetic force. In different embodiments, the keyswitch assembly 1 is provided with other elastic members (such as torsion spring, leaf spring, compression spring, etc.) to abut between the pressable plate 140 and the base 130 to provide the basic pressing resistance. As such, the magnetic attraction or repulsion force between the first magnetic acting member 110 and the second magnetic acting member 120 can be provided to increase or decrease the pressing resistance. When the magnetic force between the first magnetic acting member 110 and the second magnetic acting member 120 is the only restoring force of the keyswitch assembly 1, the magnetic force is directly provided as the only pressing resistance of the keyswitch assembly 1.

Figure 3:
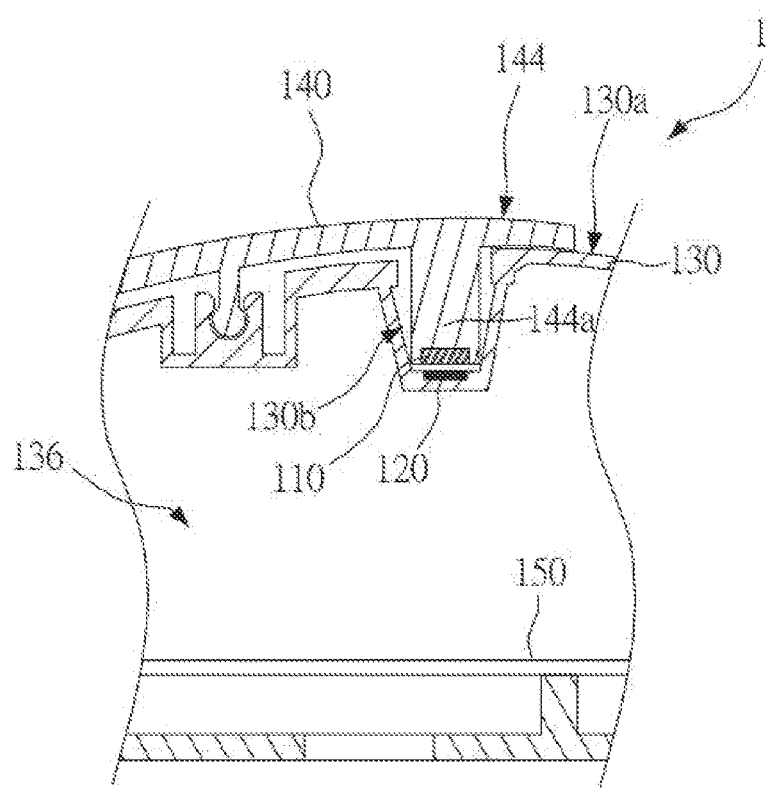
FIG. 3 and FIG. 4 are partially enlarged cross-sectional diagrams of the keyswitch assembly in the first embodiment of the present invention.

Specifically, as shown in FIG. 3, in the case that the first magnetic acting member 110 and the second magnetic acting member 120 are attracted to each other by the magnetic force, at least two specific embodiments are provided. In the first specific embodiment, the first magnetic acting member 110 is coupled to the second magnetic acting member 120 by the magnetic force, so that the magnetic force acting on the first magnetic acting member 110 is the reachable maximum value. In the second specific embodiment, due to the limitation of the acting portion 144 by the upper surface 130a of the base 130, the first magnetic acting member 110 and the second magnetic acting member 120 keep the allowed minimum interval by the structural limitation, while keeping the value of magnetic force that is less than the maximum magnetic force.

Figure 4:
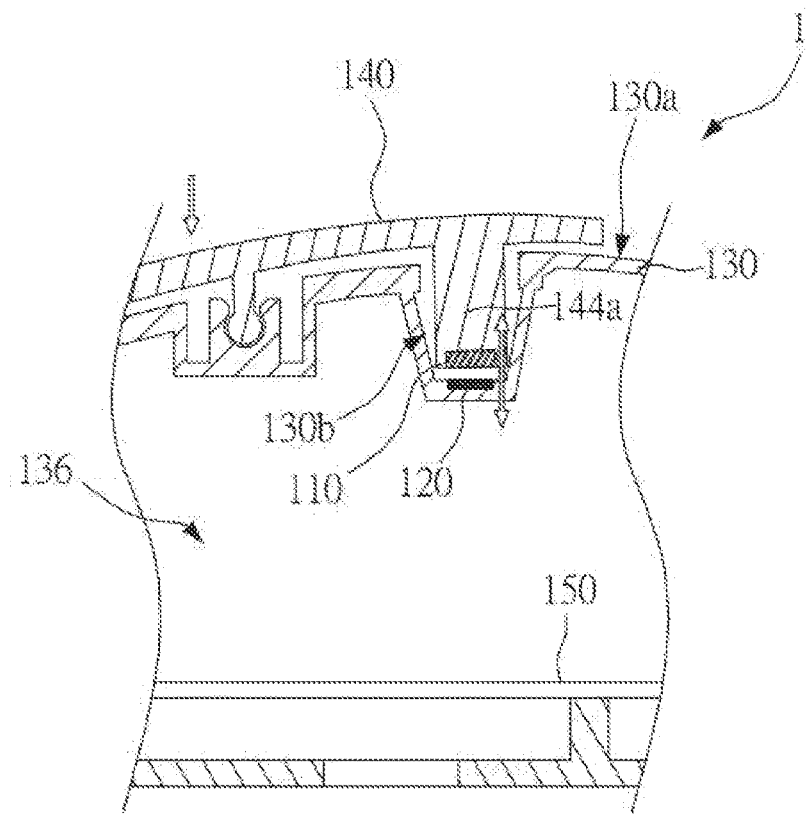

As shown in FIG. 3 and FIG. 4, when the pressing portion 142 is continuously pressed, for example, the user presses the pressing portion 142 with a finger, and the acting portion 144 exerts a pulling force on the first magnetic acting member 110 to escape the second magnetic acting member 120 through the action of the force arm. When the pulling force is gradually increased to be greater than the value of the magnetic force between the first magnetic acting member 110 and the second magnetic acting member 120, the first magnetic acting member 110 will quickly move away from the second magnetic acting member 120, so that the pressing portion 142 can instantly escape and move downward. The aforementioned instantly escaping and moving downward quickly of the pressing portion 142 will make the user perceive the pressing stroke change as the tactile feedback of pressing, which is similar to the feedback provided by the traditional mechanical microswitch.

The first magnetic acting member 110 and the second magnetic acting member 120 may be a combination of a magnet and a magnetically conductive element. For example, in one embodiment, the first magnetic acting member 110 is a magnet, and the second magnetic acting member 120 is a magnetically conductive element; alternatively, the first magnetic acting member 110 is a magnetically conductive element, and the second magnetic acting member 120 is a magnet. The magnetically conductive element can be an iron member, or other elements containing ferromagnetic material and capable of being attracted by a magnet. The magnetically conductive element can be attracted by the magnet before it is magnetized. When the magnetically conductive element is magnetized, it can be attracted to the magnet with different magnetic poles facing each other, and can be repelled from the magnet with the same magnetic poles facing each other. In different embodiments, the first magnetic acting member 110 and the second magnetic acting member 120 are respectively magnets, and the first magnetic acting member 110 and the second magnetic acting member 120 face each other with different magnetic poles, so that the first magnetic acting member 110 and the second magnetic acting member 120 are magnetically attracted to each other. Specifically, as shown in FIG. 2, FIG. 3 and FIG. 4, a groove 130b is provided on the upper surface 130a of the base 130, and the second magnetic acting member 120 is disposed at the bottom of the groove 130b. The acting portion 144 of the pressable plate 140 is provided with a protruding post 144a, which extends into the groove 130b. The first magnetic acting member 110 is disposed at the free end of the protruding post 144a, so that the first magnetic acting member 110 and the second magnetic acting member 120 are magnetically attracted to each other.

As shown in FIG. 2, FIG. 3 and FIG. 4, when the keyswitch assembly 1 is applied to a mouse or a trackball, the upper surface 130a of the base 130 is further provided with a perforation 130c, and the perforation 130c communicates with the accommodating space 136. The pressing portion 142 of the pressable plate 140 is provided with a blocking piece 142a, and the blocking piece 142a extends into the accommodating space 136 from the perforation 130c. The keyswitch assembly 1 further includes a circuit board 150 and an optical switch 160. The circuit board 150 is fixed on the lower casing 134 of the base 130 and located in the accommodating space 136. The optical switch 160 is disposed on the circuit board 150 and has a corresponding optical emitter 161 and an optical receiver (the optical receiver is omitted in the figure). When the pressing portion 142 is pressed downward and the first magnetic acting member 110 escapes from the second magnetic acting member 120, the blocking piece 142a is inserted into the optical switch 160 to block the light between the optical emitter 161 and the optical receiver, thereby triggering the optical switch 160 to generate a corresponding trigger signal. The trigger signal can be adapted as the input signal of the mouse, trackball or other devices.

As shown in FIG. 5, the first magnetic acting member 110 and the second magnetic acting member 120 are in the magnetic repulsive state. The acting portion 144 of the pressable plate 140 is located between the pressing portion 142 and the pivotal connection portion 146. The acting portion 144 of the pressable plate 140 is provided with a protruding post 144a, and the protruding post 144a extends into the groove 130b of the base 130. The first magnetic acting member 110 is disposed on the free end of the protruding post 144a. Furthermore, in this embodiment, the first magnetic acting member 110 is disposed on the side surface of the free end (first side surface S1) of the protruding post 144a, and the second magnetic acting member 120 is disposed in the groove 130b. Furthermore, in this embodiment, the second magnetic acting member 120 is disposed on the second side surface S2 of the groove 130b. The second side surface S2 preferably faces the first side surface S1. In this embodiment, the first magnetic acting member 110 is movable with the protruding post 144a because it is disposed at the free end of the protruding post 144a, and the second magnetic acting member 120 is immovable because it is disposed in the groove 130b. The first magnetic acting member 110 and the second magnetic acting member 120 are disposed with the same magnetic poles facing each other, so they are magnetically repulsed to each other. In the direction perpendicular to the first side surface S1, the projections of at least part of the areas of the two facing surfaces of the first magnetic acting member 110 and the second magnetic acting member 120 overlap to each other (i.e., partial overlap, partial displacement). In other words, only a part of the repulsive force generated between the first magnetic acting member 110 and the second magnetic acting member 120 is used as the pressing resistance.

The movable pivotal connection portion 146 can be adapted to limit the pressable plate 140 to prevent the pressable plate 140 from being separated from the base 130 while allowing the pressing portion 142 and the acting portion 144 to move relative to the base 130. In a specific embodiment, such as this embodiment, there is a post angle A (for example, an obtuse angle A in this embodiment) between the protruding post 144a (for example, its first side surface S1) and the surface of the pressable plate 140, and there is also a groove angle corresponding to the post angle between the groove 130b (for example, its second side surface S2) and the surface of the base 130, so that the protruding post 144a can move freely in the groove 130b when the pressable plate 140 is pressed and returns to the position before being pressed. In other words, in this embodiment, with respect to the bottom surface of the base 130, the protruding post 114a can slantly protrude from a lower surface of the pressable plate 140 by the post angle A, and the groove 130b is recessed from the upper surface 130a of the base 130 by a groove angle corresponding to the post angle A, so the protruding post 144a can move freely along the groove 130b when the pressable plate 140 is operated. In different embodiments, the protruding post 144a and the groove 130b may be disposed at an angle close to being perpendicular to the bottom surface of the base 130.

When the keyswitch assembly 1 is not pressed, the first magnetic acting member 110 and the second magnetic acting member 120 are repulsed to each other by the aforementioned partial magnetic force, and the generated pressing resistance pushes the pressable plate 140 upward to make the pressing portion 142 of the pressable plate 140 be kept at the highest position. During the pressing process, the external force pushes the pressing portion 142 to rotate with the pivotal connection portion 146 as the fulcrum and moves downward in an arc-shaped path, the overlapping area of the two adjacent surfaces (or the facing surfaces) of the first magnetic acting member 110 and the second magnetic acting member 120 is gradually decreased. That is, the degree of dislocation becomes higher and higher, and the magnetic repulsion force (that is, the pressing resistance) therebetween is gradually reduced. In the ending stage of the pressing process, the two adjacent surfaces of the first magnetic acting member 110 and the second magnetic acting member 120 may hardly have overlapping parts, or even be completely dislocated, so that the magnetic repulsion force and the pressing resistance are reduced to the lowest value, and when the external force is greater than the magnetic force, the instantly escaping and moving will occur to provide the tactile feedback. When the pressing force acting on the pressing portion 142 is removed, the pressable plate 140 located at the lowest point will be pushed to rotate with the pivotal connection portion 146 as the fulcrum under the action of the gradually increased magnetic repulsion force and move upward in the arc-shaped path.

It should be noted that although FIG. 1 to FIG. 6 only illustrate the combination of one pressable plate 140 and one optical switch 160, in fact, the keyswitch assembly 1 can be configured with two or more pressable plates 140, and each pressable plate 140 corresponds to one optical switch 160. For example, when the keyswitch assembly 1 is applied to a mouse or a trackball, two pressable plates 140 can be disposed in a mirrored configuration, and an accommodating space for disposing a scroll roller or a scroll ball is reserved between the two pressable plates 140. It is not excluded that the keyswitch assembly 1 has more pressable plates 140. In addition, electronic components required by the electronic device such as a mouse or a trackball can be configured on the circuit board 150. For example, when the keyswitch assembly 1 is applied to a mouse, the circuit board 150 may be further configured with a scroll roller assembly, a photoelectric track sensing assembly, etc., and the upper casing 132 or the lower casing 134 of the base 130 can be provided with a corresponding perforating structure.

Figure 7:
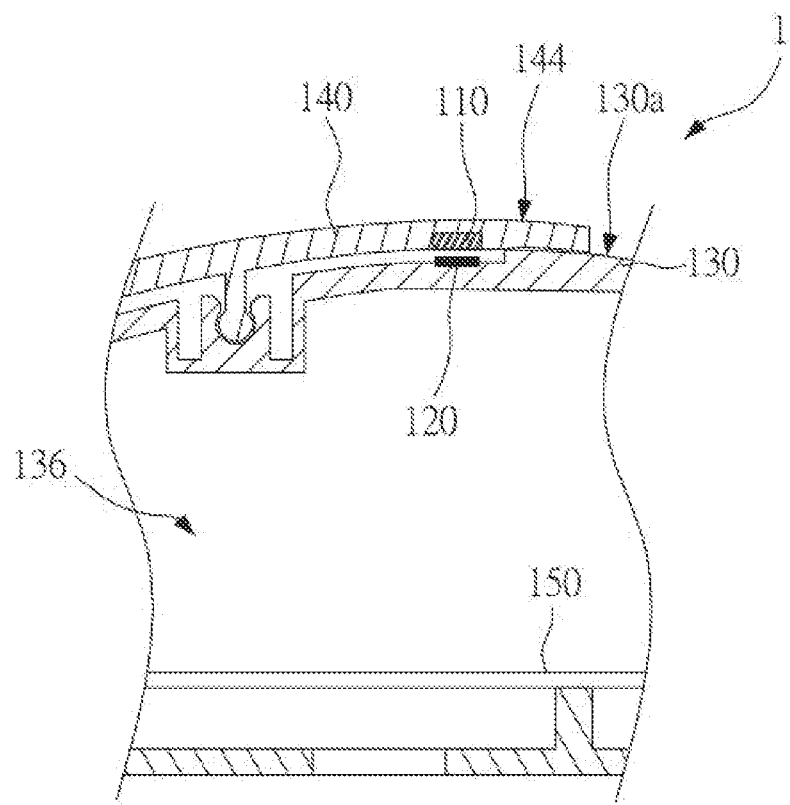
FIG. 7 and FIG. 8 are partially enlarged cross-sectional diagrams of the keyswitch assembly in the second embodiment of the present invention.
Figure 8:
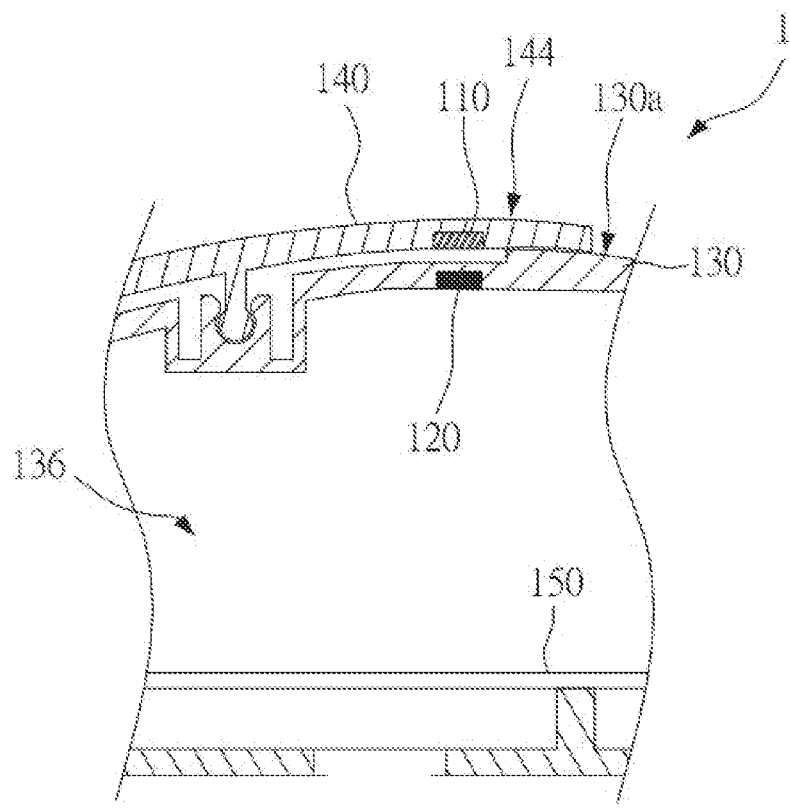

Referring to FIG. 7 and FIG. 8, a keyswitch assembly 1 in the second embodiment of the present invention is disclosed. The second embodiment is substantially the same as the first embodiment, except that in the second embodiment, the groove 130b and the protruding post 144a are omitted.

Referring to FIG. 7 and FIG. 8, the first magnetic acting member 110 is disposed on the acting portion 144 of the pressable plate 140 and located on a side of the pressable plate 140 facing the base 130. The second magnetic acting member 120 is disposed on the base 130 and embedded in the upper surface 130a, as shown in FIG. 7. Alternatively, the second magnetic acting member 120 is embedded in the inner wall surface around the accommodating space 136, as shown in FIG. 8. In FIG. 7 and FIG. 8, the second magnetic acting member 120 corresponds to the first magnetic acting member 110. The first magnetic acting member 110 and the second magnetic acting member 120 are magnetically attracted or repulsed (FIG. 7 and FIG. 8 show the embodiment with the magnetic attraction force. On the basis of the second embodiment and referring to the structure of FIG. 5 and FIG. 6, it can be slightly modified to enable the embodiment with magnetic repulsion force, which will not be repeated hereinafter), so as to provide the pressing resistance, or increase or decrease the pressing resistance. The acting portion 144 can be configured to move close to (or away from) the upper surface 130a, while the pressing portion 142 moves away from (or close to) the upper surface 130a.

Figure 9:
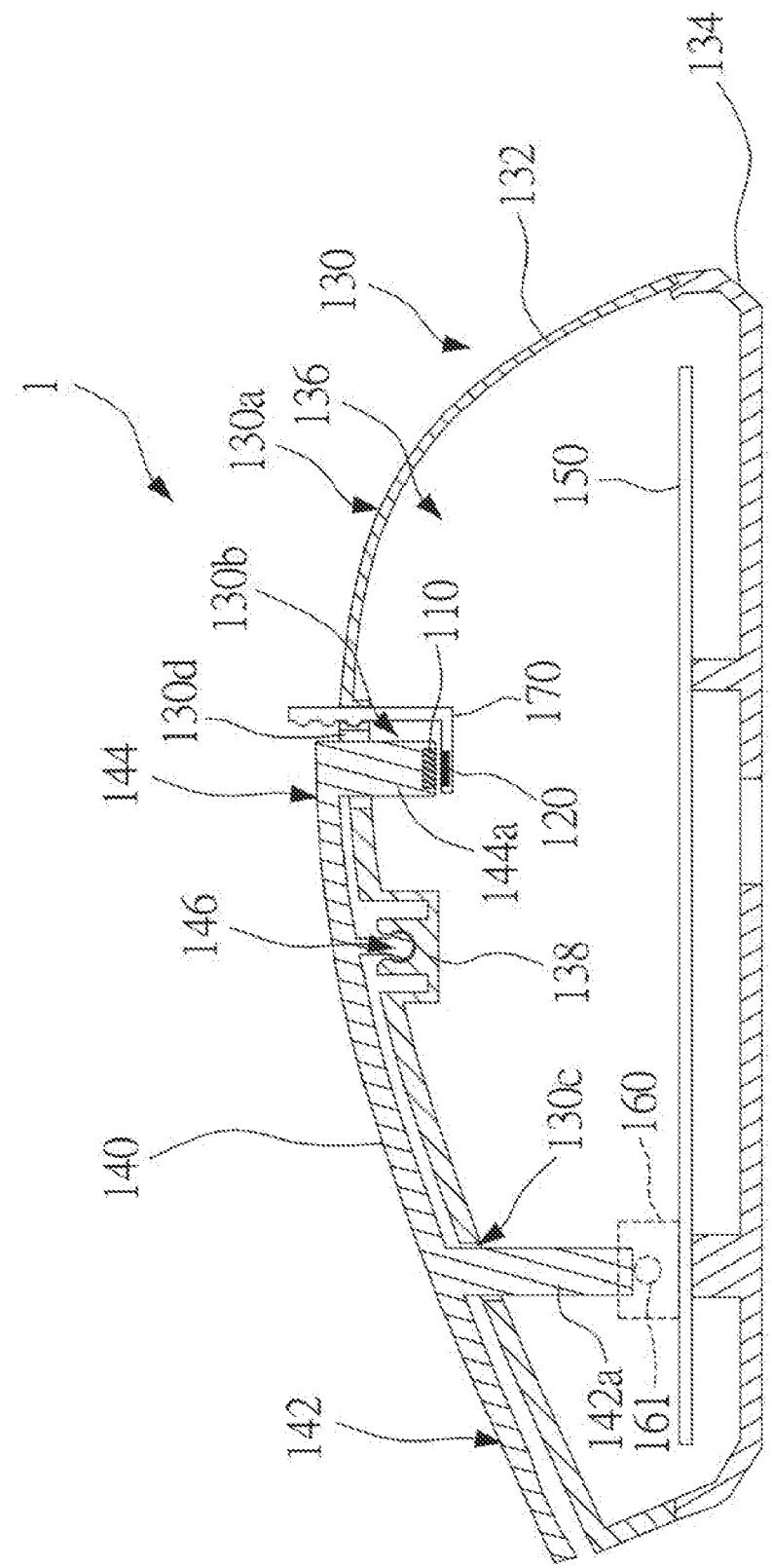
FIG. 9 is a cross-sectional diagram of the keyswitch assembly in the third embodiment of the present invention.
Figure 10:
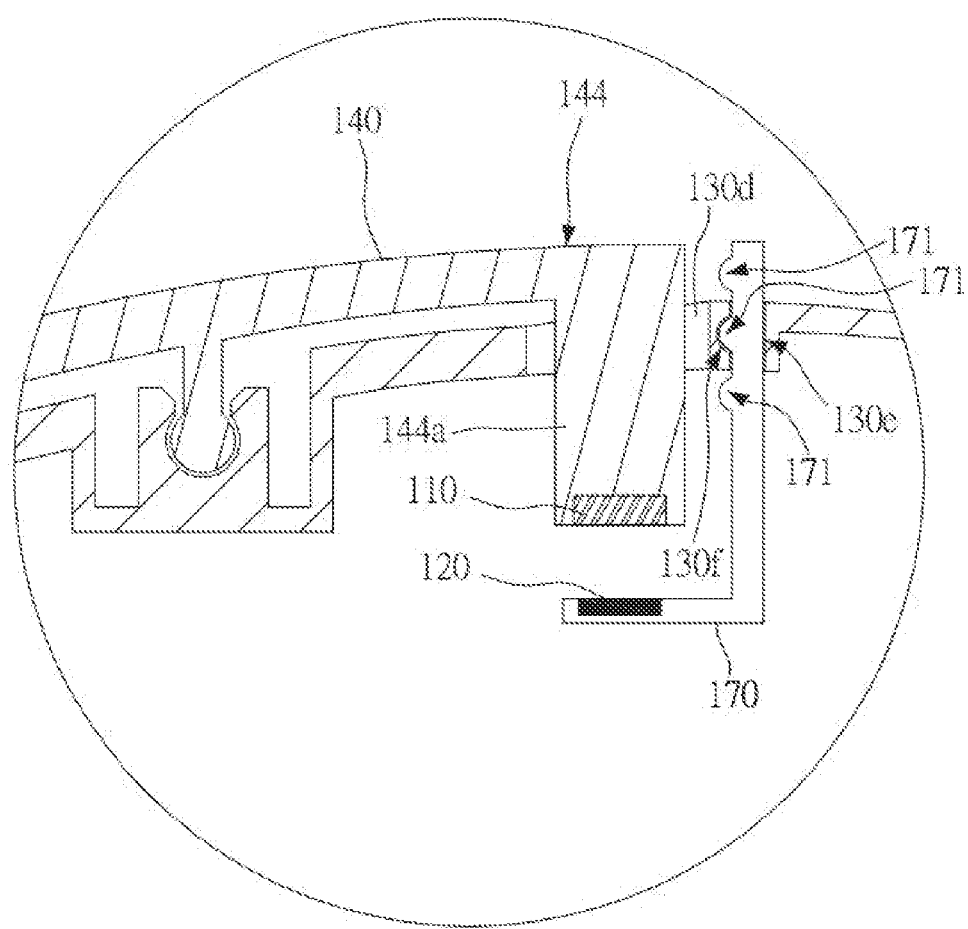
FIG. 10 is a partially enlarged cross-sectional diagram of the keyswitch assembly in the third embodiment of the present invention.

Referring to FIG. 9 and FIG. 10, a keyswitch assembly 1 in the third embodiment of the present invention is disclosed. In the third embodiment, the keyswitch assembly 1 further includes an adjusting element rotatably or movably disposed on the base 130, and the second magnetic acting member 120 is disposed on the adjusting element. An interval between the first magnetic acting member 110 and the second magnetic acting member 120 can be changed by the rotation or movement of the adjusting element.

As shown in FIG. 9 and FIG. 10, the adjusting element of the third embodiment is a movable member 170. The movable member 170 is movably disposed on the base 130 and at least partially located in the accommodating space 136. The second magnetic acting member 120 is disposed on the movable member 170, so as to be indirectly disposed on the base 130 and located in the accommodating space 136. The upper surface 130a is provided with an opening, and the protruding post 144a of the pressable plate 140 passes through the opening 130d, so that the first magnetic acting member 110 is located in the accommodating space 136. The second magnetic acting member 120 corresponds to the first magnetic acting member 110, so that the first magnetic acting member 110 and the second magnetic acting member 120 are magnetically attracted or repulsed (FIG. 9 and FIG. 10 show the embodiment with the magnetic attraction force. On the basis of the third embodiment, and referring to the structure of FIG. 5 and FIG. 6, it can be slightly modified to enable the embodiment with magnetic repulsion force, which will not be repeated hereinafter).

As shown in FIG. 9 and FIG. 10, the movable member 170 can be displaced relative to the base 130, thereby changing the interval between the first magnetic acting member 110 and the second magnetic acting member 120. Due to the change of the interval, the value of the magnetic (attraction) force between the first magnetic acting member 110 and the second magnetic acting member 120 is changed, thereby changing the tactile feedback provided as the user presses the pressing portion 142. When the interval between the first magnetic acting member 110 and the second magnetic acting member 120 becomes shorter (or even in contact with each other), the user can perceive greater tactile feedback. When the interval between the first magnetic acting member 110 and the second magnetic acting member 120 becomes longer, the user can perceive smaller tactile feedback.

As shown in FIG. 9 and FIG. 10, the upper surface 130a of the base 130 is formed with a positioning hole 130e (shown in FIG. 10), and the axial direction of the positioning hole 130e is generally directed from the upper casing 132 to the lower casing 134; that is, the axial direction of the positioning hole 130e is parallel to the longitudinal axis direction in the figure. The movable member 170 passes through the positioning hole 130e and can move relative to the base 130 along the longitudinal axis direction, so as to change the interval between the first magnetic acting member 110 and the second magnetic acting member 120 in the longitudinal axis direction, thereby changing the value of the magnetic (attraction) force between the first magnetic acting member 110 and the second magnetic acting member 120. In at least one embodiment, the movable member 170 is provided with a plurality of positioning bumps 171, and the positioning hole 130e is provided with a positioning slot 130*f*. Each positioning bump 171 can be selectively engaged with the positioning slot 130*f* to fix the interval between the first magnetic acting member 110 and the second magnetic acting member 120 in the longitudinal axis direction, so that the interval between the first magnetic acting member 110 and the second magnetic acting member 120 in the longitudinal axis can be switched between multiple levels.

Figure 11:
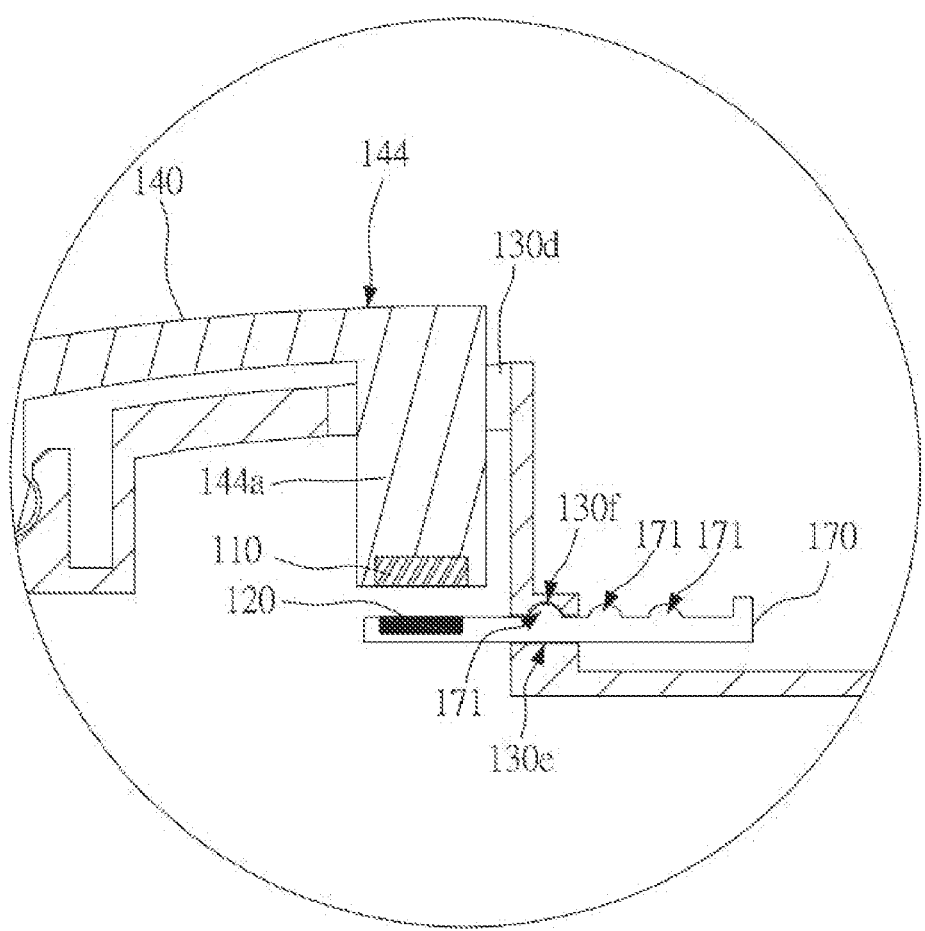
FIG. 11 is a partially enlarged cross-sectional diagram of the keyswitch assembly in the fourth embodiment of the present invention.

Referring to FIG. 11, a keyswitch assembly 1 in the fourth embodiment of the present invention is disclosed. The fourth embodiment is substantially the same as the third embodiment, except that in the third embodiment, the axial direction of the positioning hole 130*e* is substantially parallel to the lower casing 134; that is, the axial direction of the positioning hole 130*e* is parallel to the horizontal axis direction in the figure. The movable member 170 can move relative to the base 130 along the horizontal axis direction, so as to change the relative position of the first magnetic acting member 110 and the second magnetic acting member 120 in the horizontal axis direction, thereby changing the value of the magnetic (attraction or repulsion) force between the first magnetic acting member 110 and the second magnetic acting member 120 (FIG. 11 shows the embodiment with the magnetic attraction force. On the basis of the fourth embodiment, and referring to the structure of FIG. 5 and FIG. 6, it can be slightly modified to enable the embodiment with magnetic repulsion force, which will not be repeated hereinafter).

Figure 12:
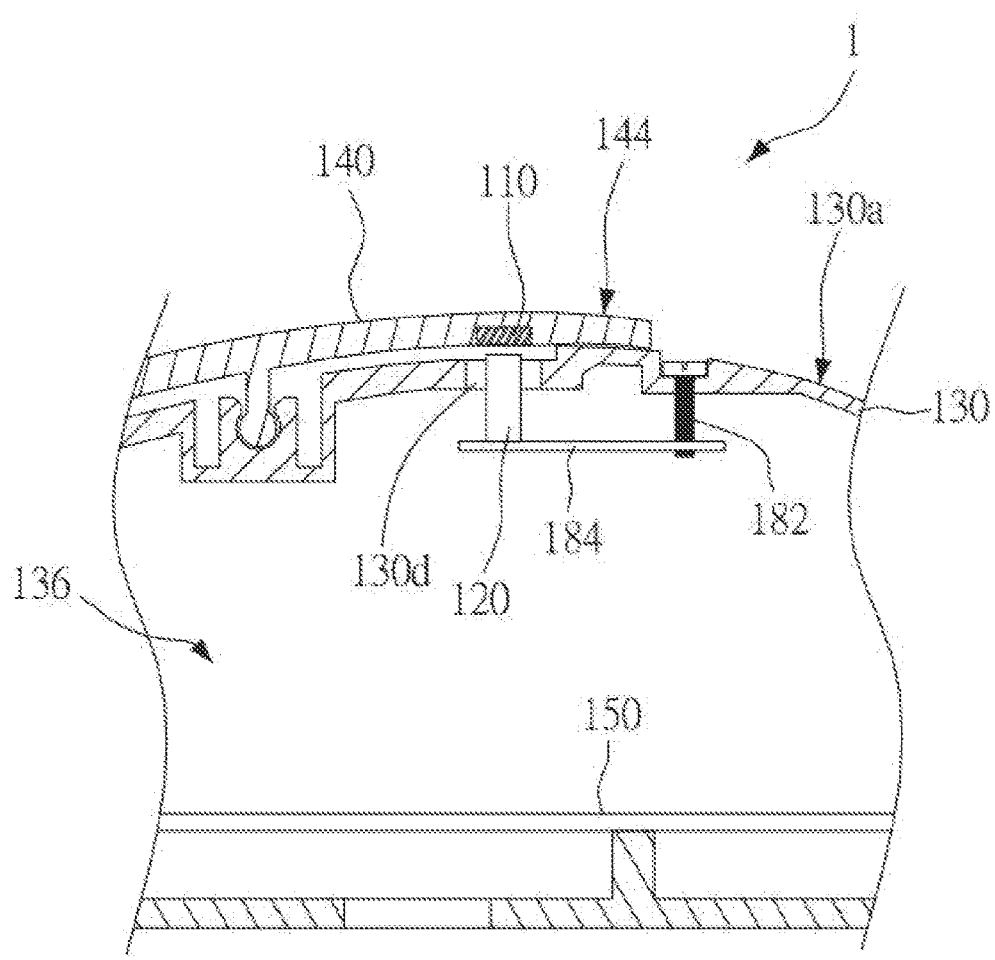
FIG. 12 is a partially enlarged cross-sectional diagram of the keyswitch assembly in the fifth embodiment of the present invention.

Please refer to FIG. 12, a keyswitch assembly 1 in a fifth embodiment of the present invention is disclosed. The keyswitch assembly 1 of the fifth embodiment is substantially the same as that of the first embodiment, except that the disposal of the first magnetic acting member 110 and the second magnetic acting member 120 is modified.

As shown in FIG. 12, in the fifth embodiment, the pressable plate 140 is not configured with the protruding post 144*a* as in the first embodiment, and the first magnetic acting member 110 is directly disposed on the acting portion 144 of the pressable plate 140 and faces the upper surface 130*a*. The upper surface 130*a* is provided with an opening 130*d*, and the opening 130*d* corresponds to the first magnetic acting member 110.

As shown in FIG. 12, the keyswitch assembly 1 further includes a fixing member 182 and a cantilever 184. The fixing member 182 is fixed on the upper casing 132 of the base 130 and at least partially located in the accommodating space 136. The cantilever 184 is located in the accommodating space 136, and one end of the cantilever 184 is fixed on the fixing member 182. The second magnetic acting member 120 is fixed to another end of the cantilever 184 and inserted into the opening 130*d*. The first magnetic acting member 110 and the second magnetic acting member 120 are normally attracted or repulsed to each other (FIG. 12 shows the embodiment with the magnetic attraction force. On the basis of the fifth embodiment, and referring to the structure of FIG. 5 and FIG. 6, it can be slightly modified to enable the embodiment with magnetic repulsion force, which will not be repeated hereinafter), so that the acting portion 144 is closer to the upper surface 130*a*, and the pressing portion 142 is farther away from the upper surface 130*a*. As shown in FIG. 12, the fixing member 182 can be a screw. The screw is secured to the upper surface 130*a* of the base 130 and extends into the accommodating space 136 to be further coupled with one end of the cantilever 184. The second magnetic acting member 120 is substantially cylindrical, and is fixed to another end of the cantilever 184 by welding, clamping or the like.

Figure 13:
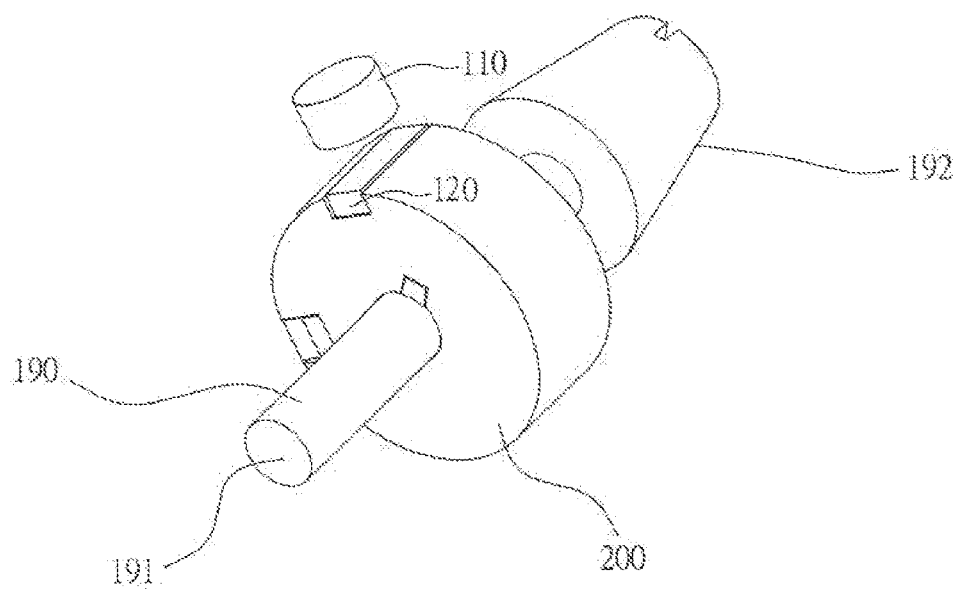
FIG. 13 is a three-dimensional schematic diagram of the appearance of the adjusting element, the first magnetic acting member and the second magnetic acting member employed in the keyswitch assembly in the sixth embodiment of the present invention.
Figure 14:
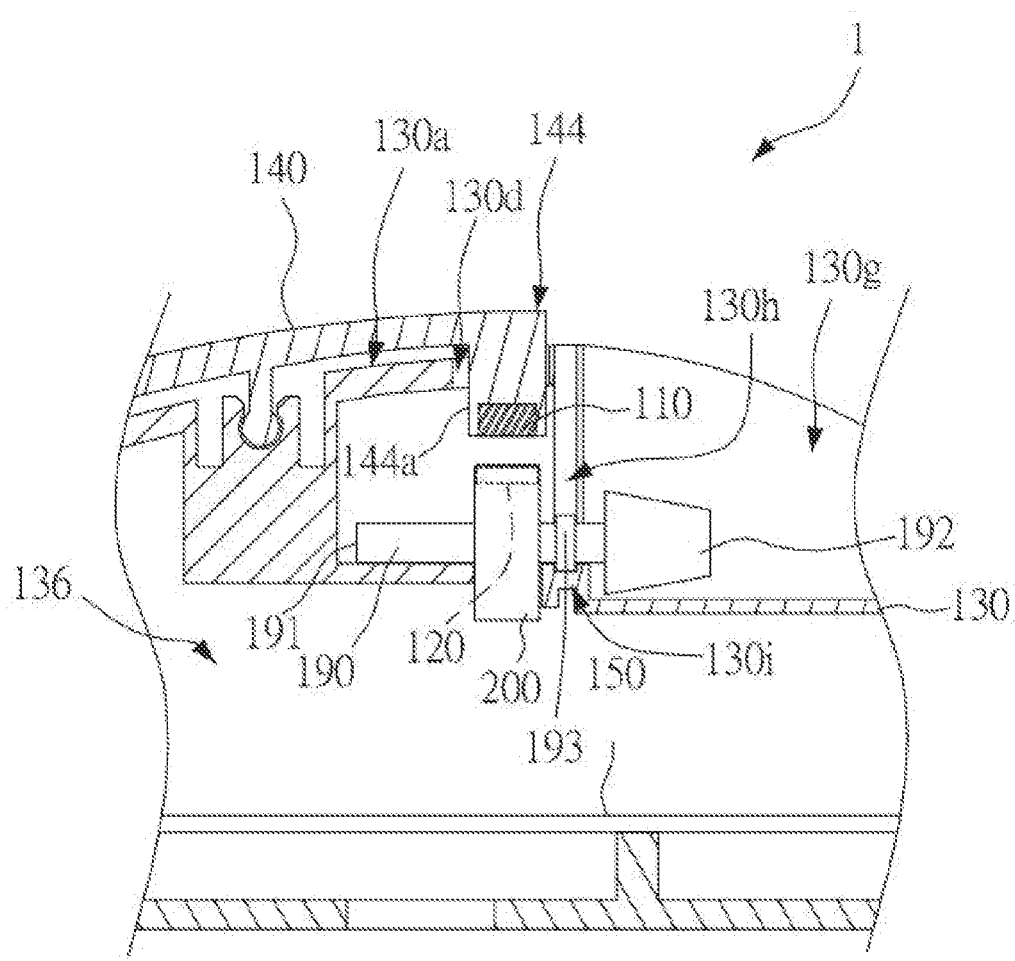
FIG. 14 is a partially enlarged cross-sectional diagram of the keyswitch assembly in the sixth embodiment of the present invention.

Please refer to FIG. 13 and FIG. 14. FIG. 13 is a three-dimensional schematic diagram of the appearance of the adjusting element, the first magnetic acting member and the second magnetic acting member in the sixth embodiment of the present invention, and FIG. 14 is a partially enlarged cross-sectional diagram of the keyswitch assembly in the sixth embodiment of the present invention. In the sixth embodiment, the adjusting element includes a shaft 190 and a turntable 200. When it is in use, the shaft 190 is rotatably disposed on the base 130, and the turntable 200 is disposed on the shaft 190 and located in the accommodating space 136. The second magnetic acting member 120 is disposed on the outer peripheral surface of the turntable 200. The rotation of the turntable 200 changes the position of the second magnetic acting member 120 and changes the interval between the first magnetic acting member 110 and the second magnetic acting member 120, thereby changing the value of the magnetic (attraction or repulsion) force between the first magnetic acting member 110 and the second magnetic acting member 120 (FIG. 13 and FIG. 14 show the embodiment with the magnetic attraction force. On the basis of the sixth embodiment, and referring to the structure of FIG. 5 and FIG. 6, it can be slightly modified to enable the embodiment with magnetic repulsion force, which will not be repeated hereinafter).

As shown in FIG. 14, the upper surface 130*a* is provided with an opening 130*d*, and the protruding post 144*a* of the pressable plate 140 passes through the opening 130*d*, so that the first magnetic acting member 110 is located in the accommodating space 136. The sixth embodiment does not exclude the omission of the protruding post 144*a*, so that the first magnetic acting member 110 is disposed on the acting portion 144 of the pressable plate 140, and located on a side of the pressable plate 140 facing the base 130 and corresponding to the opening 130*d*. Alternatively, the disposal of the opening 130*d* can be further omitted, so that the first magnetic acting member 110 and the accommodating space 136 are separated by the physical portion of the base 130.

As shown in FIG. 13 and FIG. 14, the upper surface 130*a* of the base 130 is provided with a recess 130*g*, and the recess 130*g* communicates with the accommodating space 136 of the base 130 through the opening 130*h*. A shaft seat 130*i* is disposed at the connection between the recess 130*g* and the accommodating space 136. The shaft 190 has a front portion 191, a handle portion 192 and a flange portion 193. The shaft 190 passes through the opening 130*h*, so that the front portion 191 is located in the accommodating space 136, and the handle portion 192 is located in the recess 130*g*. The flange portion 193 is located between the front portion 191 and the handle portion 192, and is seated in the shaft seat 130*i* to rotatably fix the shaft 190 to the base 130. The turntable 200 is located in the accommodating space 136 corresponding to the opening 130*d* and the first magnetic acting member 110.

As shown in FIG. 13, FIG. 14, FIG. 15 and FIG. 16, the handle portion 192 is provided for the user to rotate by hand to drive the turntable 200 to rotate, thereby changing the position of the second magnetic acting member 120. The position change of the second magnetic acting member 120 changes the interval between the first magnetic acting member 110 and the second magnetic acting member 120, thereby changing the value of the magnetic (attraction or repulsion) force between the first magnetic acting member 110 and the second magnetic acting member 120. Therefore, by rotating the handle portion 192 to rotate the shaft 190, the tactile feedback provided when the user presses the pressable plate 140 can be changed.

Figure 15:
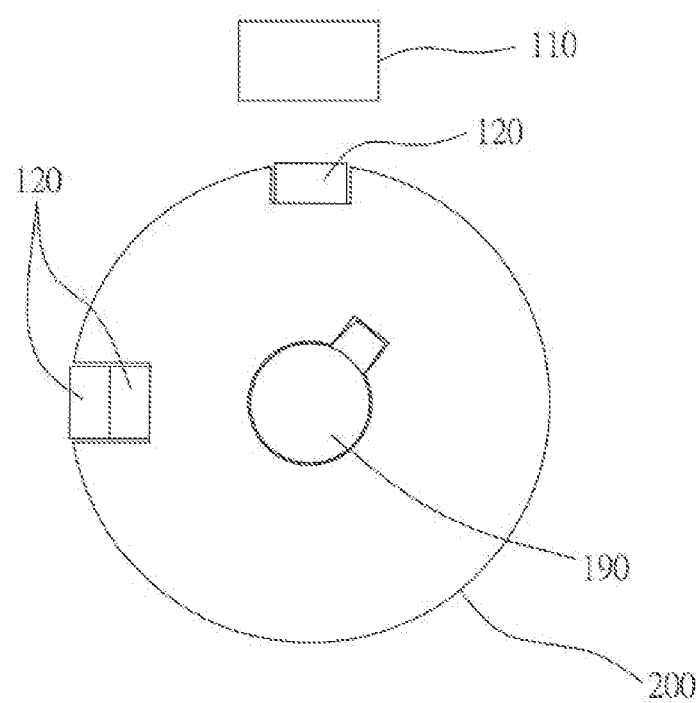
FIG. 15 and FIG. 16 are schematic front views of the adjusting element, the first magnetic acting member and the second magnetic acting member in the sixth embodiment of the present invention.
Figure 16:
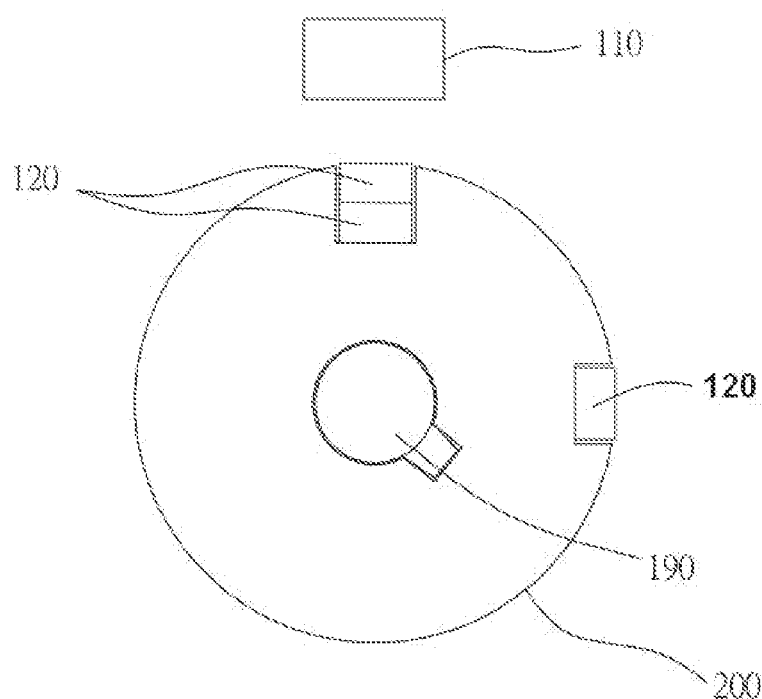

As shown in FIG. 15 and FIG. 16, in at least one embodiment, the keyswitch assembly 1 has a plurality of identical second magnetic acting members 120, and the plurality of second magnetic acting members 120 is divided into a plurality of groups. The plurality of groups is respectively disposed at different positions on the outer peripheral surface of the turntable 200, and each group has a different number of the second magnetic acting members 120. When different groups of the second magnetic acting members 120 correspond to (or act with) the first magnetic acting member 110 by rotating the shaft 190, different magnetic force values can be provided to change the tactile feedback as the user presses the pressable plate 140.

Figure 17:
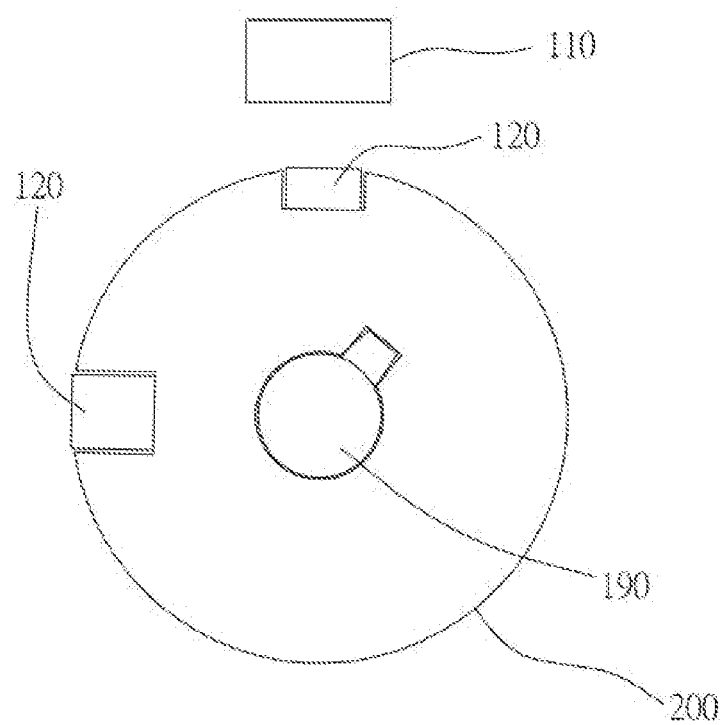
FIG. 17 and FIG. 18 are schematic front views of the adjusting element, the first magnetic acting member and the second magnetic acting member in different embodiments of the present invention.
Figure 18:
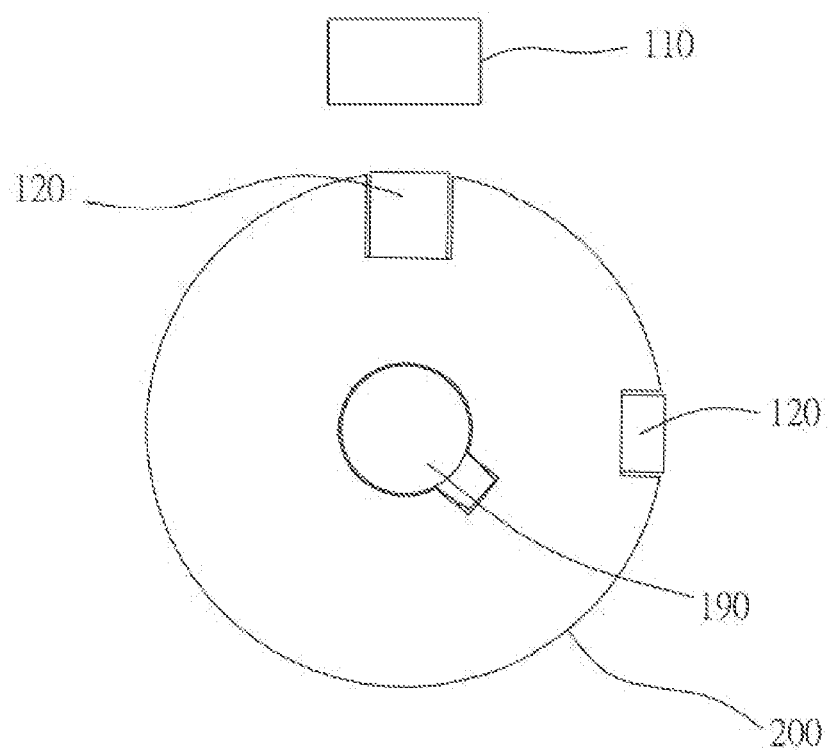

As shown in FIG. 17 and FIG. 18, in different embodiments, the keyswitch assembly 1 has a plurality of different (for example, different volumes, etc.) second magnetic acting members 120, and the plurality of second magnetic acting members 120 are respectively disposed at different positions on the outer peripheral surface of the turntable 200. When different second magnetic acting members 120 correspond to (or act with) the first magnetic acting member 110 by rotating the shaft 190, different magnetic force values can be provided to change the tactile feedback as the user presses the pressable plate 140.

Figure 19:
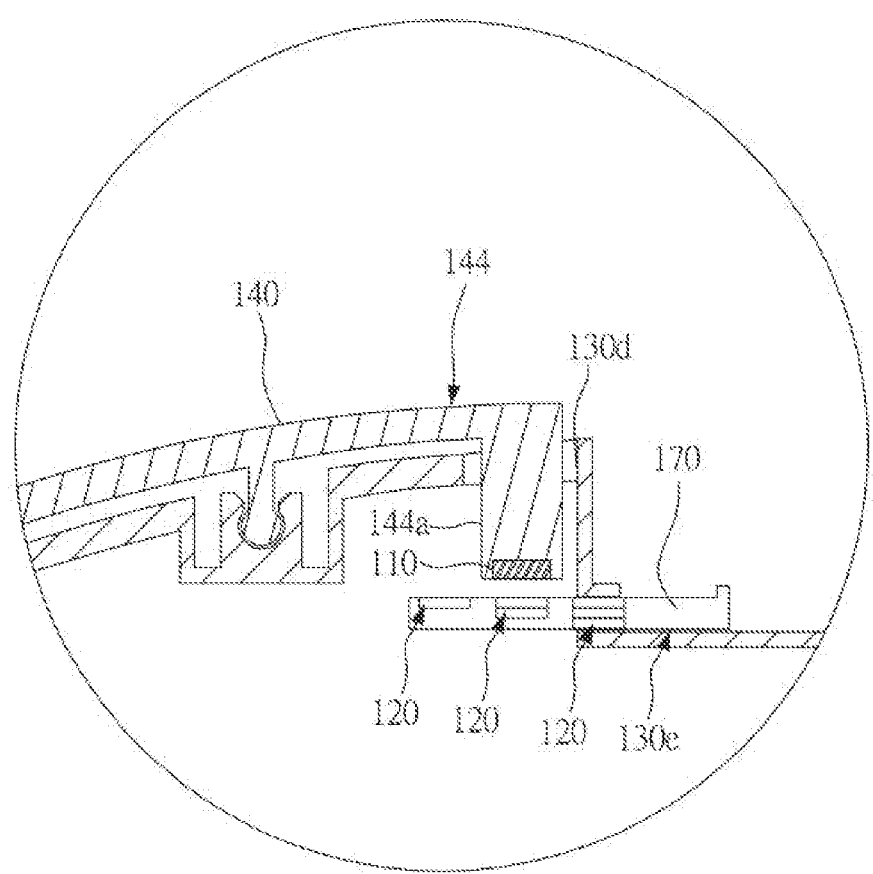
FIG. 19 and FIG. 20 are partially enlarged cross-sectional diagrams of the keyswitch assembly in different embodiments of the present invention.
Figure 20:
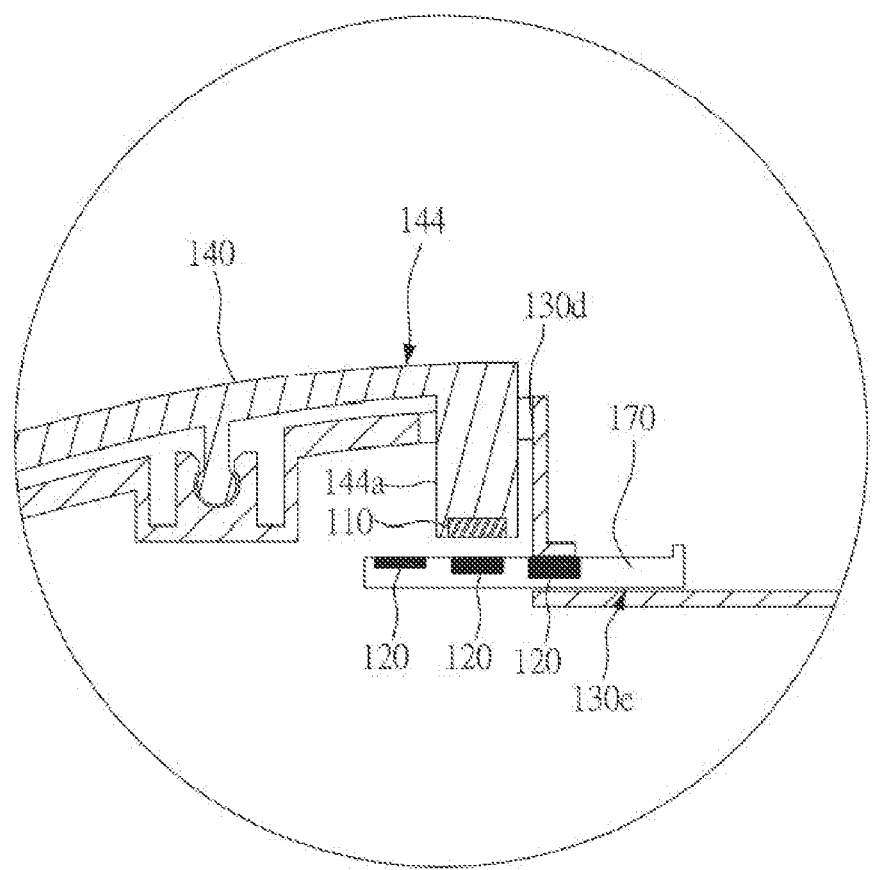

As shown in FIG. 19 and FIG. 20, in the third embodiment or the fourth embodiment, a plurality of second magnetic acting members 120 may be provided on the movable member 170 which acts as the adjusting element. As shown in FIG. 19, the keyswitch assembly 1 has a plurality of identical second magnetic acting members 120, and the plurality of second magnetic acting members 120 is divided into a plurality of groups. The plurality of groups is respectively disposed at different positions of the movable element 170, and each group has different numbers of the second magnetic acting elements 120. When different groups of the second magnetic acting members 120 correspond to (or act with) the first magnetic acting member 110 by moving the movable member 170, different magnetic force values can be provided to change the tactile feedback as the user presses the pressable plate 140. As shown in FIG. 20, the keyswitch assembly 1 has a plurality of different second magnetic acting members 120, and the plurality of second magnetic action members 120 is respectively disposed at different positions of the movable member 170. When different second magnetic acting members 120 correspond to (or act with) the first magnetic acting member 110 by moving the movable member 170, different magnetic force values can be provided to change the tactile feedback as the user presses the pressable plate 140.

Figure 21:
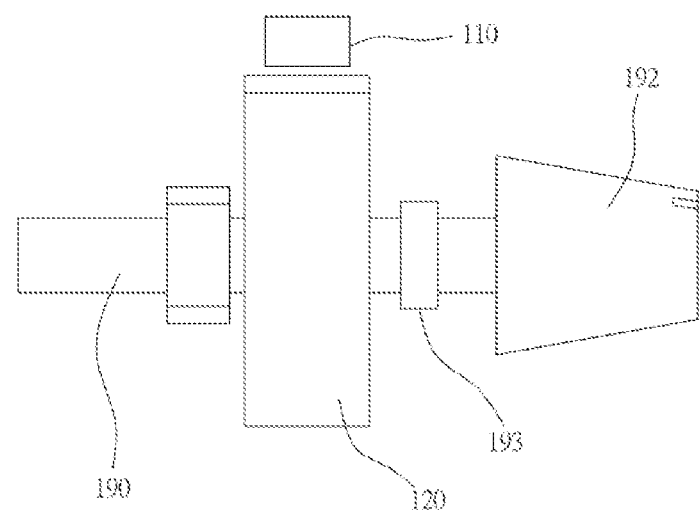
FIG. 21 is a schematic side view of the adjusting element, the first magnetic acting member and the second magnetic acting member employed in the keyswitch assembly in the seventh embodiment of the present invention.
Figure 22:
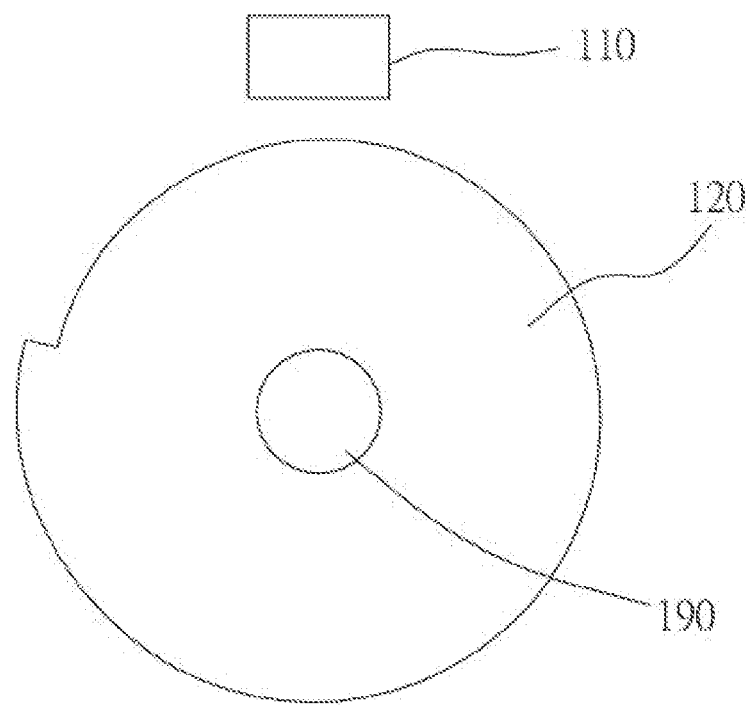
FIG. 22 and FIG. 23 are schematic front views of the adjusting element, the first magnetic acting member and the second magnetic acting member in different embodiments of the present invention.
Figure 23:
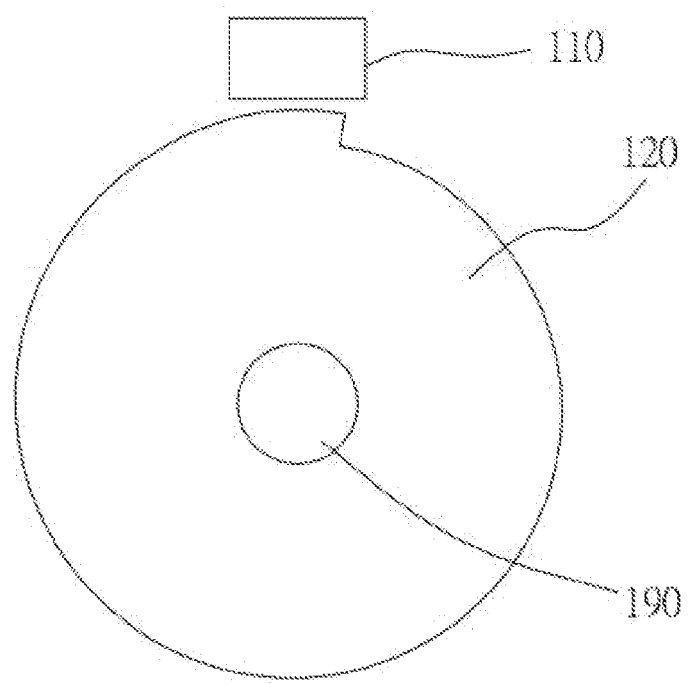

Please refer to FIG. 21, FIG. 22 and FIG. 23, which illustrate a keyswitch assembly 1 in the seventh embodiment of the present invention. The adjusting element in the seventh embodiment omits the configuration of the turntable 200, and the second magnetic acting member 120 is disposed on the shaft 190. The second magnetic acting member 120 is an eccentrically arranged rotating element; for example, the second magnetic acting member 120 can be disposed in the form of a cam or an eccentric disc. As shown in FIG. 22 and FIG. 23 as the handle portion 192 drives the shaft 190 to rotate, the minimum interval between the second magnetic acting member 120 and the first magnetic acting member 110 will be changed accordingly, thereby changing the value of the magnetic (attraction or repulsion) force between the first magnetic acting member 110 and the second magnetic acting member 120 (FIG. 21, FIG. 22 and FIG. 23 show the embodiment with the magnetic attraction force. On the basis of the seventh embodiment, and referring to the structure of FIG. 5 and FIG. 6, it can be slightly modified to enable the embodiment with magnetic repulsion force, which will not be repeated hereinafter). In order to simplify the configuration, in the seventh embodiment, the first magnetic acting member 110 is a magnet, and the second magnetic acting member 120 is preferably a magnetically conductive element, so that it does not need to consider that the change of the magnetic pole direction causes attraction to be converted into repulsion during the rotation process of the second magnetic acting member 120.

Figure 24:
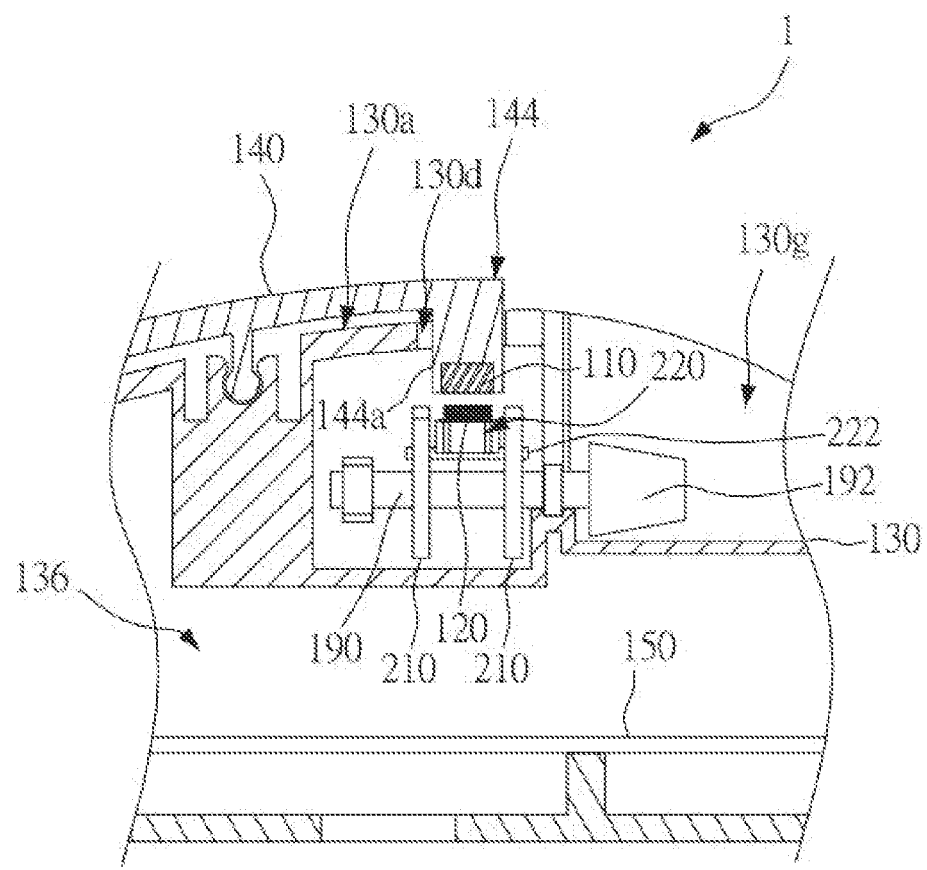
FIG. 24 is a partially enlarged cross-sectional diagram of the keyswitch assembly in the eighth embodiment of the present invention.
Figure 25:
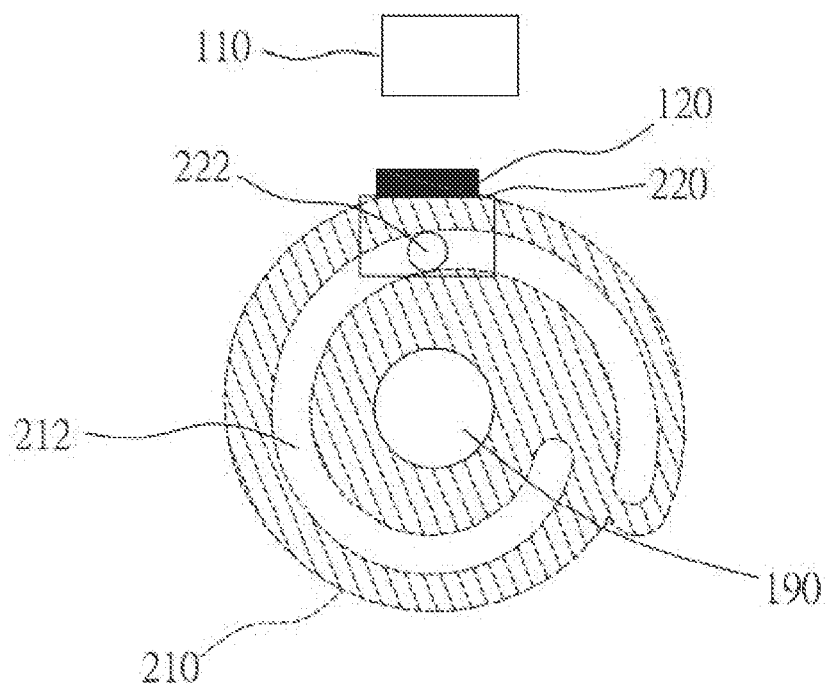
FIG. 25 and FIG. 26 are schematic front views of the adjusting element, the first magnetic acting member and the second magnetic acting member in different embodiments of the present invention.
Figure 26:
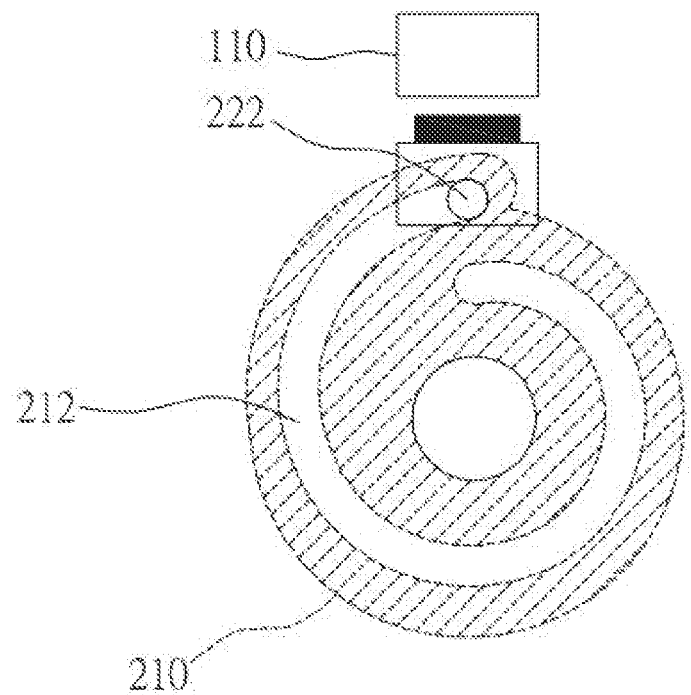

Please refer to FIG. 24, FIG. 25 and FIG. 26, which illustrate a keyswitch assembly 1 in the eighth embodiment of the present invention. The adjusting element of the eighth embodiment omits the configuration of the turntable 200. The adjusting element further includes two guiding plates 210 and a guiding base 220. The two guiding plates 210 are disposed on the shaft 190, and corresponding spiral grooves 212 are disposed on the two guiding plates 210. Two opposite sides of the guiding base 220 are provided with guiding rods 222, and each guiding rod 222 is respectively slidably inserted into the spiral groove 212. The second magnetic acting member 120 is disposed on the guiding base 220 and corresponds to the first magnetic acting member 110 (through the opening 130d or the physical portion of the base 130 interposed therebetween). The second magnetic acting member 120 is normally attracted or repulsed by the first magnetic acting member 110 (FIG. 24, FIG. 25 and FIG. 26 show the embodiment with the magnetic attraction force. On the basis of the eighth embodiment, and referring to the structure of FIG. 5 and FIG. 6, it can be slightly modified to enable the embodiment with magnetic repulsion force, which will not be repeated hereinafter), and the second magnetic acting member 120 is kept in a state of corresponding to the first magnetic acting member 110. As shown in FIGS. 25 and 26, as the handle portion 192 drives the shaft 190 to rotate, the guiding rod 222 slides along the spiral groove 212 to change the interval between the second magnetic acting member 120 and the first magnetic acting member 110, thereby changing the value of the magnetic (attraction or repulsion) force between the first magnetic acting member 110 and the second magnetic acting member 120.

From the above description, the embodiments of the present invention provide a pressing resistance and tactile feedback without the worn-down issue through the magnetic attraction or repulsion force between the first magnetic acting member 110 and the second magnetic acting member 120, and it is suitable for the switch device lack of tactile feedback, such as optical switch 160. The process of generating the tactile feedback does not involve the interferences between the physical connecting elements, which can avoid the worn-down operations between the elements. The embodiments of the present invention can also rapidly increase or decrease the magnitude of the pressing resistance or the tactile feedback by adjusting the relative positions and numbers of the magnetic acting members. In addition, the disposed positions of the various magnetic acting members (groups) described in the foregoing embodiments may correspond to the front and rear sides of the pivotal connection portion of the pressable plate. For example, each magnetic acting member (group) may be located at the front side of the pivotal connection portion 146 close to the pressable portion (for example, the pressing position of the finger corresponding to the left and right buttons of the mouse), or each magnetic acting member (group) can be located at the rear side of the pivotal connection portion close to the rear end of the pressable plate (for example, the root position of the operating finger corresponding to the left and right buttons of mouse or near the front edge of the palm).

In the embodiment of the present invention, the first magnetic acting member 110 and the second magnetic acting member 120 are attracted or repulsed to each other by the magnetic force, and an instant escape will be produced when the external force is greater than the magnetic force, which can effectively replace the traditional tactile feedback produced by the traditional mechanical structure, and it is suitable for the switch devices lack of tactile feedback, such as the optical switch 160. The process of generating the tactile feedback does not involve the interferences between the elements, which can avoid the worn-down operations between the elements. The embodiment of the present invention can also rapidly increase or decrease the magnitude of the pressing resistance or the tactile feedback by adjusting the relative positions between the magnetic acting members. In addition, the disposed positions of the various magnetic acting members (groups) introduced in the foregoing embodiments may correspond to the front and rear sides of the fulcrum P of the pressable plate used for pivotal connection. For example, each magnetic acting member (group) may be located at the front side of the fulcrum P close to the pressable portion (for example, the pressing position of the finger corresponding to the left and right buttons of the mouse), or each magnetic acting member (group) can be located at the rear side of the fulcrum P close to the rear end of the pressable plate (for example, the root position of the operating finger corresponding to the left and right buttons of mouse or near the front edge of the palm).

Although the preferred embodiments of the present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. A keyswitch assembly, comprising:
    a base having an upper surface and an accommodating space;
    a pressable plate having a pressing portion, an acting portion, a blocking piece and a pivotal connection portion, the pressable plate being pivotally connected to the base;
    a first magnetic acting member disposed on the acting portion;
    a second magnetic acting member disposed on the base corresponding to the first magnetic acting member, wherein the first magnetic acting member and the second magnetic acting member are configured to be attracted or repulsed each other by a magnetic force, so as to provide or change a pressing resistance of the pressing portion;
    an adjusting element rotatably or movably disposed on the base, wherein the second magnetic acting member is disposed on the adjusting element; a relative position of the first magnetic acting member to the second magnetic acting member is changed by rotation or movement of the adjusting element;
    a circuit board fixed on the base and located in the accommodating space; and
    an optical switch disposed on the circuit board,
    wherein when the pressing portion is pressed to enable the first magnetic acting member to move relative to the second magnetic acting member, the blocking piece blocks an optical path of the optical switch to trigger the optical switch to generate a trigger signal.

2. The keyswitch assembly of claim 1, wherein the upper surface is provided with a groove adapted to accommodate the second magnetic acting member in the groove;
    the acting portion is provided with a protruding post extending into the groove; the first magnetic acting member is disposed on a free end of the protruding post.

3. The keyswitch assembly of claim 2, wherein the protruding post has a first surface; the groove has a second surface; the first surface includes a post angle with a surface of the pressable plate; the second surface includes a groove angle with a surface of the base; the groove angle corresponds to the post angle.

4. The keyswitch assembly of claim 1, wherein the first magnetic acting member is located on a side of the pressable plate facing the base, and the second magnetic acting member is embedded on an inner wall surface around the accommodating space.

5. The keyswitch assembly of claim 1, wherein the upper surface is provided with a perforation communicating with the accommodating space; the blocking piece extends into the accommodating space from the perforation.

6. The keyswitch assembly of claim 5, wherein the keyswitch assembly comprises a plurality of the second magnetic acting members; the plurality of the second magnetic acting members is the same and divided into a plurality of groups having different numbers of the second magnetic acting members; the plurality of groups is respectively disposed at different positions of the adjusting element.

7. The keyswitch assembly of claim 5, wherein the keyswitch assembly comprises a plurality of the second magnetic acting members; the plurality of the second magnetic acting members is different in magnetic intensity and respectively disposed at different positions of the adjusting element.

8. The keyswitch assembly of claim 1, further comprising:
    a fixing member fixed on an upper casing of the base, the fixing member at least partially located in the accommodating space; and
    a cantilever located in the accommodating space, one end of the cantilever fixed on the fixing member, and another end of the cantilever adapted to position the second magnetic acting member;
    wherein the upper surface of the base is provided with an opening corresponding to the first magnetic acting member, and the second magnetic acting member is partially received in the opening.

9. The keyswitch assembly of claim 1, wherein:
    the adjusting element comprises a movable member movably disposed on the base, and the movable member is at least partially located in the accommodating space;
    the upper surface of the base is provided with an opening, the acting portion is provided with a protruding post extending into the opening, and the second magnetic acting member is disposed on the movable member; and
    the movable member is adapted to move relative to the base to change the relative position of the first magnetic acting member and the second magnetic acting member.

10. The keyswitch assembly of claim 9, wherein the upper surface is formed with a positioning hole, and the movable member passes through the positioning hole.

11. The keyswitch assembly of claim 10, wherein the positioning hole is provided with a positioning slot; the movable member has a plurality of positioning bumps selectively engaged with the positioning slot.

12. The keyswitch assembly of claim 1, wherein the adjusting element comprises:
    a shaft rotatably disposed on the base; and
    a turntable disposed on the shaft,
    wherein the second magnetic acting member is disposed on an outer peripheral surface of the turntable.

13. The keyswitch assembly of claim 1, wherein the adjusting element comprises:
    a shaft rotatably disposed on the base;
    a guiding plate disposed on the shaft, and provided with a spiral groove; and
    a guiding base provided with a guiding rod slidably inserted into the spiral groove,
    wherein the second magnetic acting member is disposed on the guiding base,
    wherein the guiding rod slides in the spiral groove to change an interval between the second magnetic acting member and the first magnetic acting member as the shaft rod rotates.

14. A keyswitch assembly, comprising:
    a base having an upper surface;
    a pressable plate having a pressing portion, an acting portion and a pivotal connection portion, the pressable plate being pivotally connected to the base;
    a first magnetic acting member disposed on the acting portion; and
    a second magnetic acting member disposed on the base corresponding to the first magnetic acting member, wherein the first magnetic acting member and the second magnetic acting member are configured to be attracted or repulsed each other by a magnetic force, so as to provide or change a pressing resistance of the pressing portion,
    an adjusting element rotatably or movably disposed on the base, wherein the second magnetic acting member is disposed on the adjusting element; a relative position of the first magnetic acting member to the second magnetic acting member is changed by rotation or movement of the adjusting element;
    wherein the pivotal connection portion is located between the pressing portion and the acting portion; the first magnetic acting member on the acting portion and the second magnetic acting member on the base are attracted to each other by the magnetic force.

15. The keyswitch assembly of claim 1, wherein the acting portion is located between the pressing portion and the pivotal connection portion, or the pressing portion is located between the acting portion and the pivotal connection portion, the first magnetic acting member on the acting portion and the second magnetic acting member on the base are repulsed to each other by the magnetic force.

16. The keyswitch assembly of claim 1, wherein the first magnetic acting member is located on a side of the pressable plate facing the base, and the second magnetic acting member is embedded on the upper surface.

17. A keyswitch assembly, comprising:
    a base having an upper surface;
    a pressable plate having a pressing portion, an acting portion and a pivotal connection portion, the pressable plate being pivotally connected to the base;
    a first magnetic acting member disposed on the acting portion;
    a second magnetic acting member disposed on the base corresponding to the first magnetic acting member, wherein the first magnetic acting member and the second magnetic acting member are configured to be attracted or repulsed each other by a magnetic force, so as to provide or change a pressing resistance of the pressing portion; and
    an adjusting element rotatably or movably disposed on the base, wherein the second magnetic acting member is disposed on the adjusting element: a relative position of the first magnetic acting member to the second magnetic acting member is changed by rotation or movement of the adjusting element;
    wherein the adjusting element is a shaft; the second magnetic acting member is disposed on the shaft; the second magnetic acting member is an eccentrically arranged rotating; the second magnetic acting member is adapted to rotate with the shaft to change a minimum interval between the second magnetic acting member and the first magnetic acting member.

18. The keyswitch assembly of claim 17, wherein:
    the base has an accommodating space;
    the upper surface is provided with a recess, and the recess communicates with the accommodating space through an opening; a shaft seat is disposed between the recess and the accommodating space; and
    the shaft has a front portion, a handle portion and a flange portion, the shaft is inserted through the opening, so the front portion is located in the accommodating space, the handle portion is located at the recess, and the flange portion is located between the front portion and the handle portion and seated in the shaft seat.

* * * * *